United States Patent
O'Neill et al.

(10) Patent No.: US 7,395,151 B2
(45) Date of Patent: Jul. 1, 2008

(54) SYSTEM AND METHOD FOR KNOWLEDGE-BASED EMERGENCY RESPONSE

(76) Inventors: Dennis M. O'Neill, 2904 University Blvd., Houston, TX (US) 77005; Guillermo Francisco Arango, 4807 Spruce St., Bellaire, TX (US) 77401

(*) Notice: Subject to any disclaimer, the term of this patent is extended or adjusted under 35 U.S.C. 154(b) by 524 days.

(21) Appl. No.: 11/039,718

(22) Filed: Jan. 19, 2005

(65) Prior Publication Data

US 2005/0209770 A1 Sep. 22, 2005

Related U.S. Application Data

(60) Provisional application No. 60/547,094, filed on Feb. 24, 2004.

(51) Int. Cl.
*G01C 21/30* (2006.01)
(52) U.S. Cl. .................. 701/209; 701/210; 340/988
(58) Field of Classification Search ............. 701/209, 701/200, 280, 208, 210; 340/906, 988
See application file for complete search history.

(56) References Cited

U.S. PATENT DOCUMENTS

| 6,940,422 | B1* | 9/2005 | Bachelder et al. ............ 340/906 |
| 2001/0029425 | A1* | 10/2001 | Myr ............................ 701/200 |
| 2004/0030493 | A1* | 2/2004 | Pechatnikov et al. ......... 701/208 |
| 2005/0131641 | A1* | 6/2005 | Beesley et al. .............. 701/209 |

* cited by examiner

*Primary Examiner*—Mark Hellner
(74) *Attorney, Agent, or Firm*—Pehr Jansson; The Jansson Firm

(57) ABSTRACT

A knowledge-based system and method for establishing and managing routes for emergency vehicles. The knowledge-based system and method uses a knowledge base having information useful in establishing and managing routes for emergency vehicles including information on intersections, road segments connecting intersections, expected travel time along the road segments, and dynamic factors that influence traffic flow, and a database for storing routes designed using the information useful in establishing and managing routes. The knowledge-based system also consist of one or more software modules operable to retrieve information from the knowledge base and to perform operations such as designing routes between location involved in emergency response, selecting between such routes, and modifying such routes all using information in the knowledge base.

36 Claims, 14 Drawing Sheets

600

SYSTEM AND METHOD FOR KNOWLEDGE-BASED EMERGENCY RESPONSE

CROSS-REFERENCE TO RELATED APPLICATIONS

This application is a non-provisional patent application claiming priority from provisional application Ser. No. 60/547,094, filed on Feb. 24, 2004, entitled "Architecture and Methods for Designing, Deploying and Managing Efficient Access and Evacuation Routes," the teachings of which are incorporated by reference herein as if reproduced in full below.

TECHNICAL FIELD

The present invention relates generally to emergency response systems and more particularly to a knowledge-based approach for designing, selecting, and managing routes for emergency response.

BACKGROUND OF THE INVENTION

Anyone who has lived even a short amount of time in a large and densely populated metropolitan area, such as Houston, Texas, has witnessed emergency vehicles caught in traffic jams on clogged freeways or seen such vehicles slow to a snail's pace in crossing intersections for fear that the intersecting motorists may not have heard the sirens over the din of car radios. Survival, health, safety, and security are fundamental concerns shared by nearly the entire global population. Therefore, all who sit in these traffic jams, bemoaning the plight of the ambulance drivers who futilely attempts to have the sea of cars part before them, reflect on their fortune in not being the victim who may be riding in the back of the ambulance or who may not be reached in time.

When an incident occurs and first responders (fire department, police, Emergency Medical Services (EMS)) are dispatched to the scene of the incident, the responders often only have a street address or a general location of the incident. If they are familiar with the area, they may recognize the address; or the dispatcher may be able to provide them with additional information via radio while they are en route. In general, however, first, second or third waves of responders are unlikely to have additional information about the locale (e.g., the urban setting, building and structures, access and lanes), best routes into and out of an area under current conditions (e.g., flooding of low sections of roads), and potential obstacles to traffic (e.g., railroad crossings, roads likely to be jammed at certain times).

Lack of knowledge of the preferred routes under current conditions results in significant loss of critical time and higher risk to the responders en route. These factors can result in response delays and loss of life and property that could be avoided if responders had access to optimal and protected routes to and from emergency situations. This is especially true in medical emergencies. The value of transporting a seriously injured victim to a trauma center as soon as possible is well understood and being able to accomplish this within the "Golden Hour" is a critical factor in survivability.

The Golden Hour is a term used in emergency medicine and refers to the first sixty minutes after an accident or the onset of acute illness. The victim's chances of survival are greatest if he or she can be transported to a hospital within the Golden Hour.

The "Golden Hour" concept comes from the U.S. military experience, especially in the Vietnam War. The fact is that in the case of a severe trauma, nothing can replace surgery (especially in case of an internal bleeding); it is therefore necessary to transport the victim as fast as possible to a trauma center.

Emergency response units can be slowed down by the driver's lack of familiarity with the location, traffic patterns on the way, temporary roadwork, or blocked railroad crossings. Time lost in reaching the site of an incident works against the responders' objective to mount an appropriate response. Time lost in evacuating victims reduces their chances of survival or recovery. In some cases, responding units may be put temporarily out of service or lost due to events such as traffic accidents or flooded roads, resulting in damaged assets, injured personnel, and the inability to respond to an incident.

Thus, it is desirable to supply responders with accurate information of the best possible access and evacuation routes in real time, to have the capability to dynamically redesign and implement such routes to account for the consequences of developing situations, and to have the capability to implement and to protect these routes by controlling traffic control devices to maximize responders' speed and safety and victims' chances of survival.

Furthermore, all parties who can contribute by making a response to an incident must have access to as much information specific to the event as possible and be able to contribute information and their expertise in a timely manner. Today, there is no unified method for capturing, organizing, updating and disseminating the information concerning an incident in a manner by which the information may be useful to emergency response personnel in selecting and managing routes to and from emergency incident locations.

While the past three decades have seen tremendous advances in relevant information technology, such as the widespread deployment of the commercial Internet, availability of portable and wireless devices, and the collection of a vast amount of information, these technologies and information have not been efficiently harnessed to provide better and safer ingress and egress routes for emergency response vehicles. It would be desirable to use these capabilities to provide crisis managers, first responders, and support organizations with incident-specific information (historical, calendar-based, and real-time information) anytime, anywhere, so as to afford response vehicles better and safer access and evacuation routes to and from emergency incident locations.

From the foregoing it will be apparent that there is still a need for an improved method to provide information in regard to road networks, road conditions, and traffic patterns to crisis managers, first responders, and their support organizations, and to make use of the control capabilities for traffic control devices so as to provide responders to emergency events efficient routes to and from incident locations.

SUMMARY OF THE INVENTION

In a preferred embodiment, the invention provides a knowledge-based system and method for providing information in regard to road networks, road conditions, and traffic patterns to crisis managers, first responders, and their support organizations and using that information to provide responders to emergency events efficient routes to and from incident locations. In a further aspect of the invention, a knowledge-based system makes use of the control capabilities for traffic control devices so as to provide responders to emergency events such efficient and safe routes to and from incident locations.

An embodiment of a knowledge-based system for establishing and managing routes for emergency vehicles according to the invention includes a knowledge base contining information on intersections, road segments connecting intersections, expected travel time along the road segments, and dynamic factors that influence traffic flow. The knowledge-based system further includes a routes database for storing routes designed using the information useful in establishing and managing routes, and one or more modules operable to retrieve information from the knowledge base and to perform an operation selected from designing one or more routes between a first location and a second location, selecting a route from the routes database, and modifying a route in the routes database.

The present invention may be implemented as a method for establishing and managing routes for emergency vehicles by creating a knowledge base having information information on intersections, road segments connecting intersections, expected travel time along the road segments, and dynamic factors that influence traffic flow, and storing routes designed using the information useful in establishing and managing routes. The method further includes retrieving information from the knowledge base and performing an operation selected from designing one or more routes between a first location and a second location, selecting a route from the routes database, and modifying a route in the routes database.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
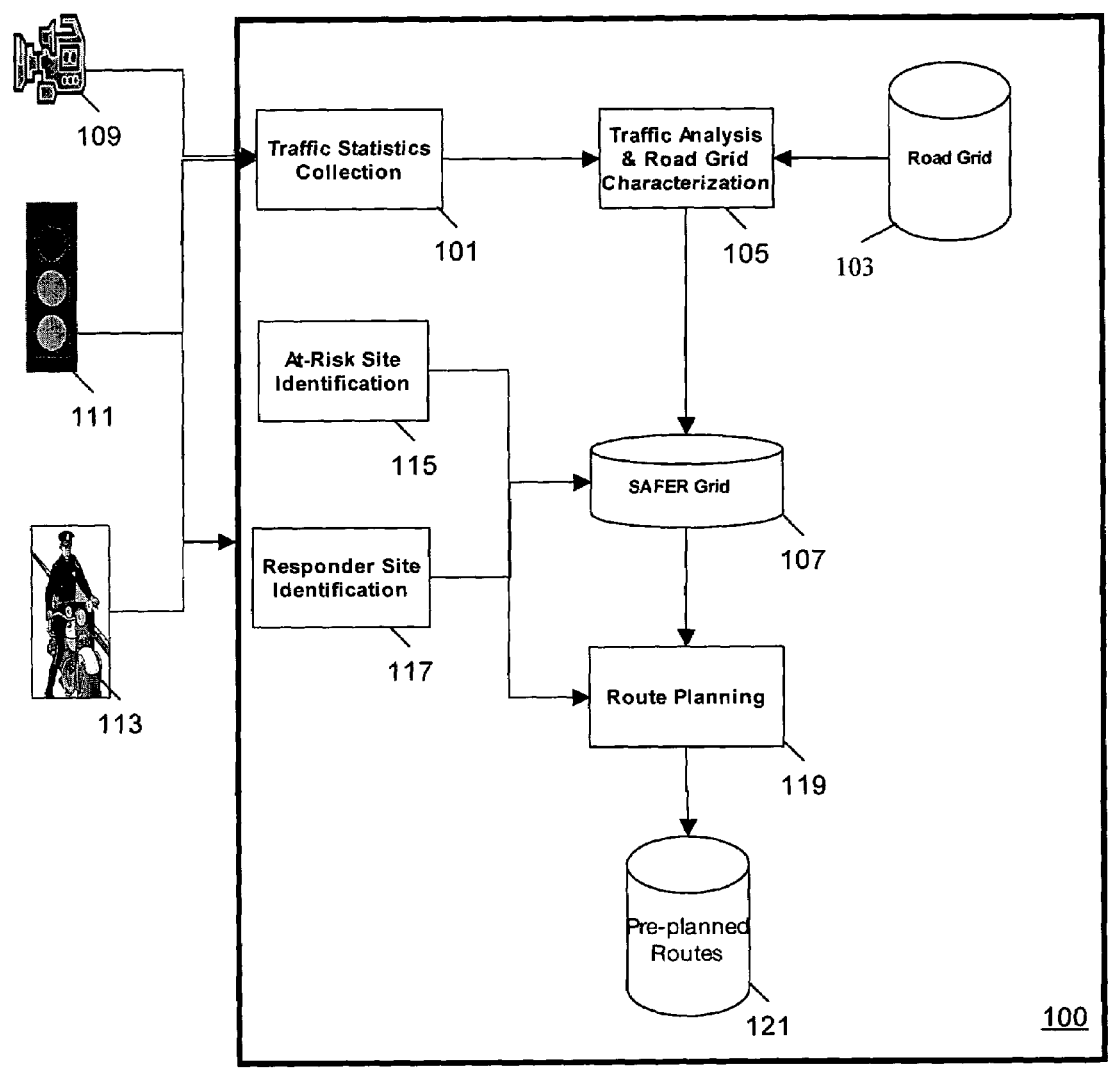
FIG. 1 is a schematic illustration of the route design phase components of a knowledge-based system for emergency response according to the invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

1.0 Introduction

As shown in the drawings for purposes of illustration, a knowledge-based system for establishing and managing routes to and from sites requiring assistance of emergency vehicles provides crisis managers, first responders, and their support organizations time-critical access to information and resources useful in designing, selecting, and using routes between locations where an incident requiring assistance has occurred and sites where response units are located or to where response units must travel. Hitherto, first responders have often little less than their own local knowledge available when selecting a route to travel in response to an emergency call. Furthermore, the responders usually have no way or very limited power to control the traffic flow along their proposed travel route.

A knowledge-based system for emergency response according to the invention provides access to knowledge bases with information about relevant road grids, projected travel times, time-dependent information and user interfaces that may be used to design, select and deploy efficient routes. Travel times are improved. Safety is improved. A resulting advantage is that in many cases emergency response will be quicker and more timely, thereby allowing emergency personnel to reach emergency situations and transport victims to a hospital within the time period most useful in treating such victims.

Figure 3:
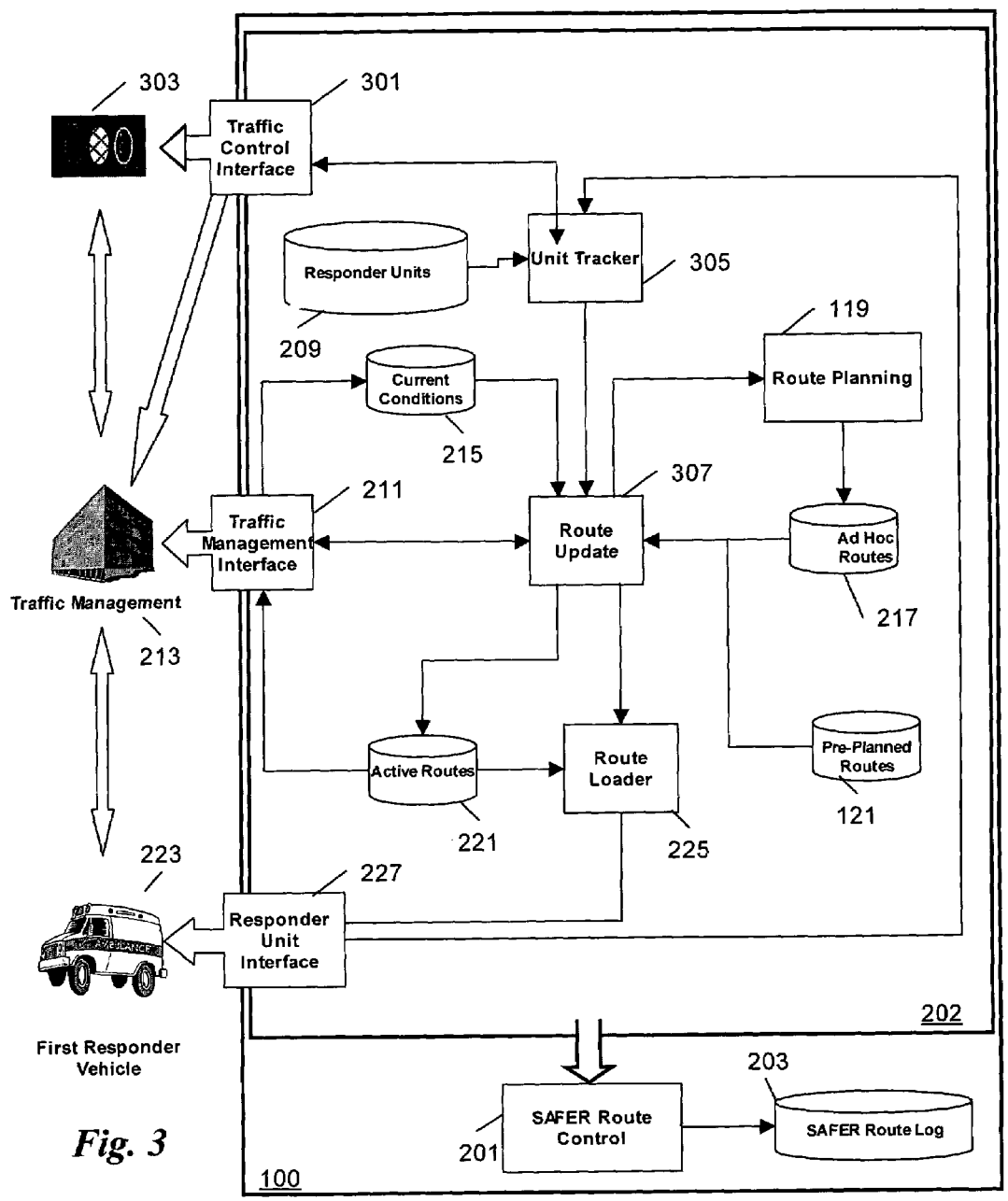
FIG. 3 is a schematic illustration of the components, interfaces and operations that are used in the route execution and monitoring phase of the knowledge-based system for emergency response.
Figure 4:
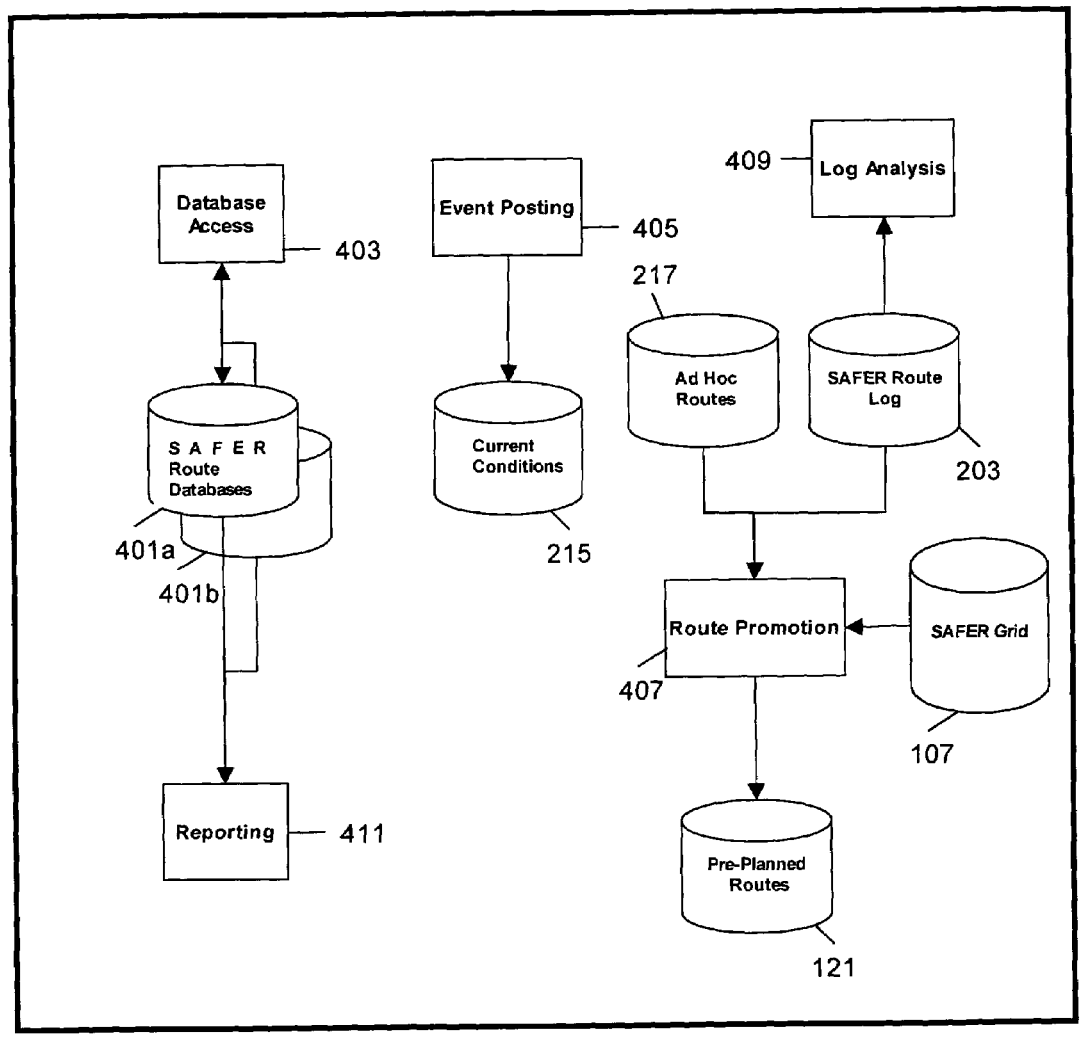
FIG. 4 is a schematic illustration of the components, interfaces and operations that are used during the administrative phase of the knowledge-based system for emergency response.
Figure 5A:
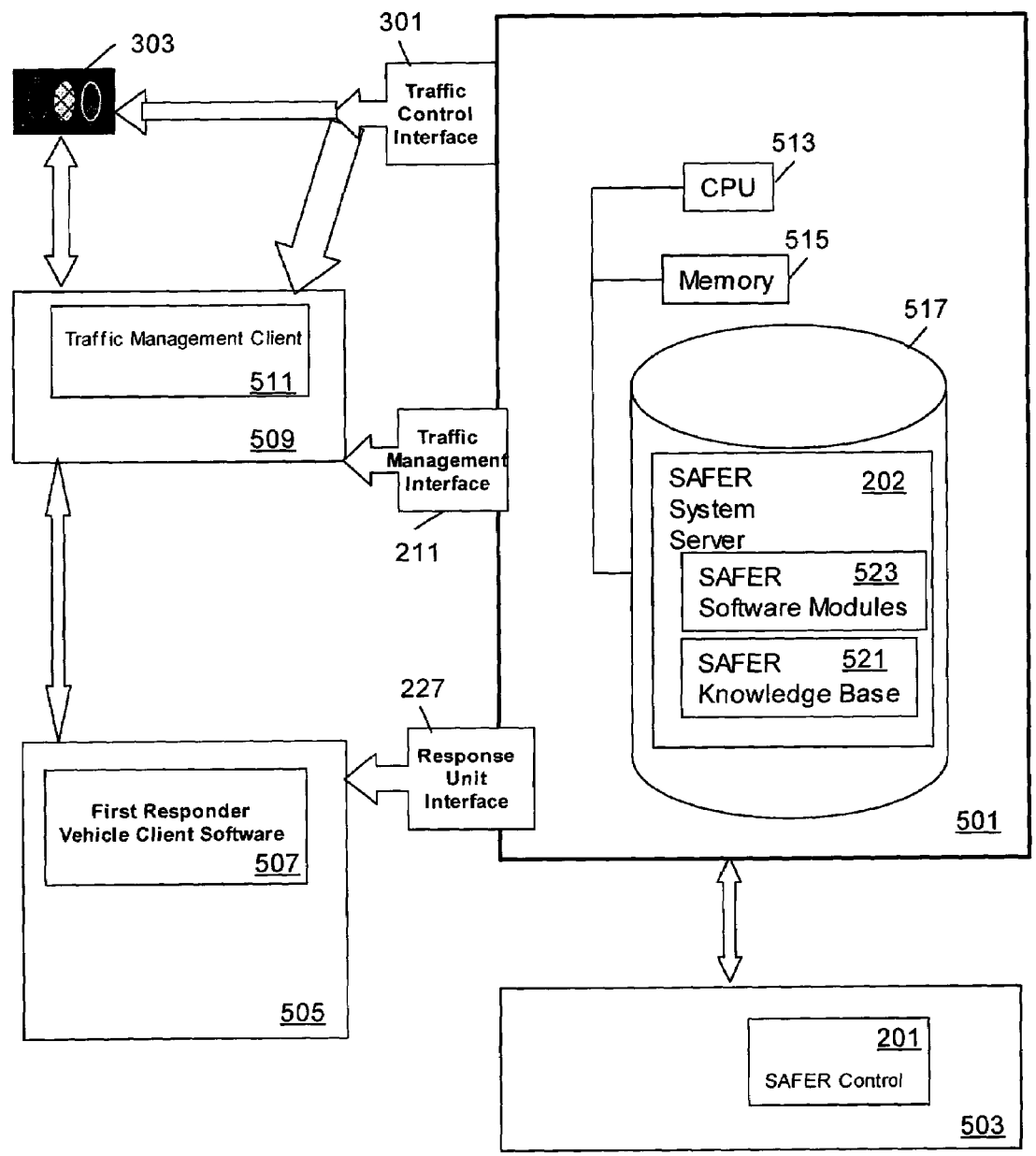
FIGS. 5a and 5b are block diagrams illustrating one possible network architecture for an implementation of a knowledge-based solution for emergency response according to the invention.
Figure 5B:
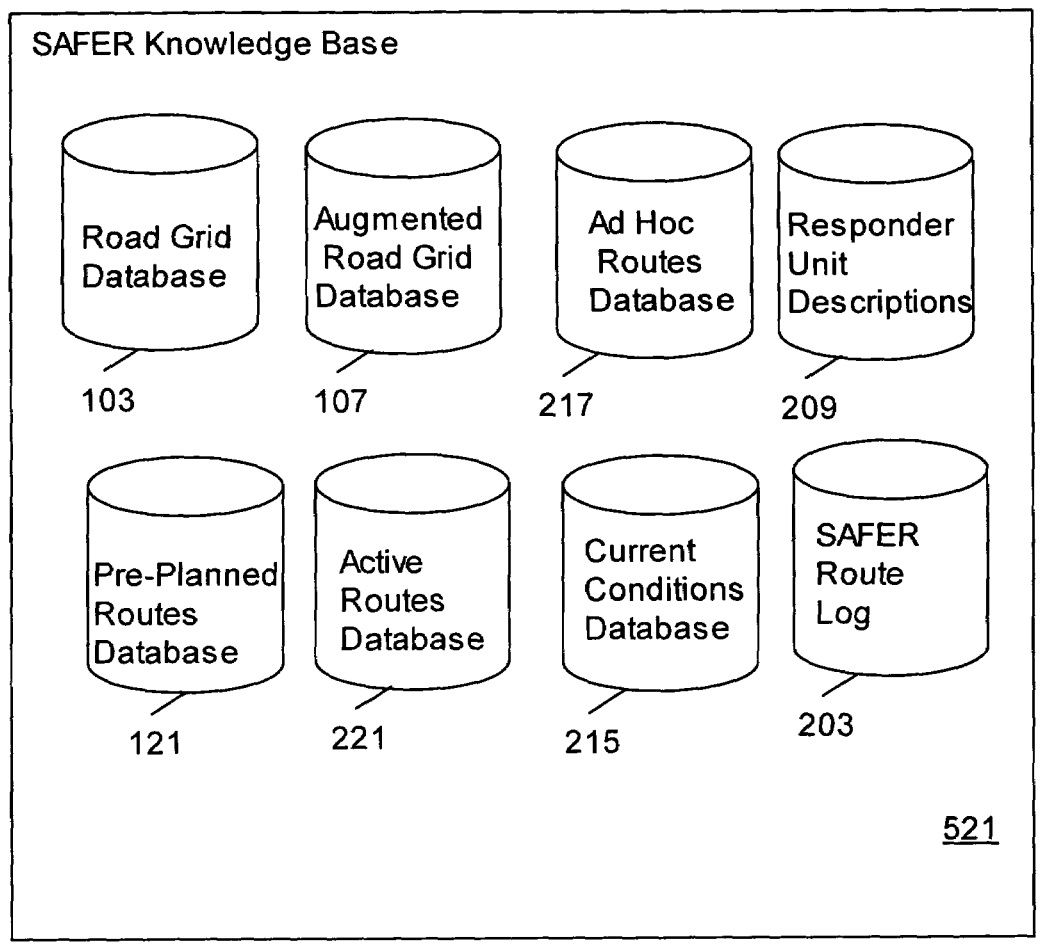

FIGS. 1 through 4 provide an illustrative overview of the knowledge-based approach for establishing and managing routes for emergency response according to the invention. FIGS. 5a and 5b are block diagrams illustrating a high-level hardware and software architecture for one implementation of a knowledge-based approach for establishing and managing routes for emergency response according to the invention. It should be noted here the various databases that are shown and described in conjunction with FIGS. 1 through 4, including a Road Grid database 103, SAFER Road Grid database 107, an Ad Hoc Routes database 217, a Responder Units Descriptions database 209, a Pre-Planned Routes database 121, an Active Routes database 221, a Current Conditions database 215, and a SAFER Route Log 203 database, are components of a Knowledge Base 521 used in designing and managing routes for emergency response. Alternative implementations of the invention employ different network technologies and topologies. Furthermore, alternative implementations may include other infrastructure components than those illustrated in the figures and described herein. Such alternatives are within the scope of this invention.

The invention provides a system that integrates several components of the existing traffic control and emergency response infrastructure to enhance efficiency and safety in the use of access and evacuation routes by emergency/incident response units.

The main components leveraged by a preferred embodiment of the invention include:
  A grid of fixed points with sensors (e.g., cameras, vehicle counters, flood level sensors) and actuators (e.g., camera controls, traffic light sequencers, highway message boards)
  A grid management system that allows remote access and management of sets of sensors and actuators
  Mobile computers for First Responders to provide them with two-way access to dispatch and command centers with standard software clients, communications and applications
  Information servers connected to the grid
  Information models for describing, classifying, organizing, storing, accessing and presenting information in context
  Information security including user authentication and access control policies
  Workflow, collaboration and knowledge management applications.

In a given metropolitan environment, some of these components are available today. The widespread deployment of the commercial Internet has resulted in the standardization of IT and services, reduction in costs of broadband network access in urban areas, widespread use of affordable network-capable devices, and public awareness. This increased availability of information technology has increased by orders of magnitude the ability of individuals in the public and private sector to act as consumers and suppliers of information. In large metropolitan areas one may typically find the following:
  Broadband municipal networks have been deployed for traffic management.
  Fixed networks of sensors, today associated with traffic management, will be augmented with additional sensors oriented to public safety and homeland security in the near future.
  Robust wireless high-speed digital networks are available over most of the area.
  Secure communications with strong authentication can be implemented over these networks.
  Affordable personal computing and communications devices with multi-media capabilities are becoming widespread among agencies and citizens.
  Public records in digital form are becoming increasingly available.

Furthermore, in regions deploying the Intelligent Transportation Systems (ITS) infrastructure and architecture, plans and funding are already in place for many others. ITS is described in greater detail in U.S. Department of Transportation, Intelligent Transportation Systems, http://www.its.dot.gov, herein incorporated by reference, Federal Highway Administration, U.S. Department of Transportation, *National ITS Architecture Version* 5.0, http://itsarch.iteris.com/itsarch, also incorporated herein by reference, and *National ITS Architecture*, Architecture Development Team, Federal Highway Administration, US Department of Transportation, Washington D.C. 20590, October 2003, http://itsarch.iteris.com/itsarch, also incorporated by reference.

1.1 Note on Use of Trademarks

For the sake of clarity, trademarks of the assignee of this invention are used here for the purpose of describing certain preferred embodiments of the invention. A knowledge-based system for design, management, and deployment of routes used by emergency response vehicles is described herein. Such a system is referred to herein as a SAFER Route system (SAFER is a trademark of SAFER Technologies, L.L.C.). Conversely, a route that is designed or used by the SAFER Route system is referred to herein as a SAFER Route route. One aspect of the invention is a road grid that has been augmented in a manner described herein below. Such an augmented road grid is referred to herein as a SAFER Route Grid database. Thus, while the SAFER trademark and variations thereof have been used to describe specific embodiments of the invention, such use of trademarks must not be used to limit the scope of the claims to the particular implementations associated with those trademarks.

2.0 Components of a SAFER Route System According to the Invention

The SAFER Route system 100 consists of a combination of automated operations, databases and components that allow operators to perform certain knowledge-based assisted operations. These knowledge-base assisted operations include establishing and managing routes used by emergency response vehicles; the design of such routes, both as pre-planned routes designed in anticipation of a later need for emergency response and as ad hoc routes that are designed to address an immediate need for emergency response; and adjusting the pre-planned routes based on real-time information relating to conditions that occur during the execution of a mission by a response vehicle along such a route.

2.1 SAFER Route Design Phase

FIG. 1 is a schematic illustration of the design phase components of the SAFER Route system 100.

In the design phase, basic information about a region to be placed under operation of a knowledge-based system for emergency response is collected, organized, analyzed, and used to identify target destinations for SAFER Route route end points and to design SAFER Route routes in advance of the actual use. FIG. 1 depicts schematically the components, interfaces and operations that are used in this phase. FIG. 1 also depicts their relationships schematically.

2.1.1 Traffic Statistics Collection and Characterization

A Traffic Statistics Collection and Characterization activity 101 assembles and organizes all of the relevant information about traffic flow in a region under consideration. The information can come from a variety of sources such as data from daily ITS traffic monitoring, surveys taken by municipal, regional, state-wide or federal traffic entities, observations made by traffic management and control professionals, etc. Examples include data observed by traffic monitoring equipment 109, sensors associated with traffic signals 111, and on-site observers 113. The traffic monitoring equipment 109 may be in the form of video cameras mounted to produce continuous video streams of traffic conditions that may be interpreted by an operator and entered into supporting databases. The sensors associated with traffic signals include such sensors as traffic counters and sensors that may indicate that a vehicle is waiting for a traffic light to change, e.g., to make a left turn. Similarly, on-site observers 113, e.g., policemen familiar with an area, may provide information relating to traffic patterns in an area of familiarity, e.g., the length of time usually required to empty a stadium parking lot after a sporting event. The observations of traffic conditions may be interpreted by an operator and entered into supporting databases. On-site-observer-generated traffic statistics collection and characterization is part of the current day-to-day operations of modern traffic management organizations. The SAFER Route system 100 takes advantage of the existing body of knowledge contained in such data. Additional data collection to support SAFER Route deployment may also take place, for example, special traffic surveys that take place outside of the normal day-to-day traffic management, e.g., counting cars to determine whether a new traffic light or stop sign is required at a currently uncontrolled intersection.

In addition to average traffic-flow data (e.g., average number of vehicles per unit time at Point X during time period Y), the Traffic Statistics Collection activity 101 also includes identification of time-dependent factors that influence traffic flow. This includes, for example, specifying the location of school zones and their hours of enforcement, starting and quitting times at major employers, etc.

Typically, the Traffic Statistics Collection and Characterization activity 101 is performed manually or through operation of database queries on databases containing the desired traffic statistics. The collection of information (historic data, statistics, or information in regard to particular events) feed into the knowledge base and the decision processes that lead to route design and management use this gathered information.

2.1.2 Road Grid Database

A road grid database 103 is a computer model of the public road network within a region and contains information specifying which intersections have some form of traffic control (e.g., stop signs, stop lights), the nature of the control (e.g., fixed sequencing, programmable sequencing, emergency override, ITS control), and whether certain segments have special traffic control/flow capabilities (e.g., high occupancy vehicle (HOV) lanes, contra-flow lanes, programmable message boards, etc.). Of particular interest are those traffic signals that can be remotely controlled via human or computer request. These form the basis for the most effective use of the SAFER Route approach. Thus, the road grid database 103 defines intersections, paths connecting intersections, and the nature of the intersections. In addition to public thoroughfares, in alternative embodiments, the road grid database 103 also contains information defining privately-controlled access ways that may be used in emergency situations (e.g., roads on a large industrial site, railroad rights of way, etc.) including intersections, nature of intersections, and traffic control at intersections found in such privately-controlled access ways. There are numerous ways in which a road grid may be represented in a road grid database 103. One example is the ESRI GIS platform which is a fairly wide-spread platform for capturing and managing road grid representations. The ESRI GIS platform is described in greater detail in T. Ormsby, et al., *Getting to Know ArcGIS Desktop*, Second, ESRI Press, 2004, ISBN: 158948083X, which is incorporated herein in its entirety.

The elements from the Road Grid database 103 are the shapefiles that define the major roads, the "footprint" of all roads (i.e., the "pavement" shapefile), locations of railroads ("railroad"), creeks/rivers ("waterways"), and so forth. In many, if not most, municipalities the road grid shapefiles already exist and are available for purchase.

2.1.3 Traffic Analysis and Road Grid Characterization

A Traffic Analysis and Road Grid Characterization activity 105 examines the traffic statistics and road grid information and uses this information to identify patterns in the data (e.g., 25% of the vehicles approaching intersection X from the south turn left between 7:00 AM and 8:30 AM on weekdays) and computes the average time to transit between designated locations at various times (e.g., every fifteen minutes, by day of the week, etc.). The Traffic Analysis and Road Grid Characterization activity 105 augments the Road Grid database 103 with the traffic pattern data from the Traffic Statistics Collection 101 and with the average transit time data. This augmented data is stored in an augmented road grid database, and referred to herein as the SAFER Grid database 107.

2.1.4 SAFER Grid Database

The SAFER Grid database 107 contains all of the information that was captured by the Traffic Analysis and Road Grid Characterization activity 105. Each entity in the Road Grid (i.e., road segment, type of intersection, type of traffic signal, etc.) is augmented with the time-based information gathered from the Traffic Analysis and Road Grid Characterization activity 105. The augmented grid database 107 is organized to support route definition and analysis by other components of the SAFER system 100.

The SAFER Grid database 107 also contains information describing locations that presents particular high risk of being a location having an emergency requiring response by emergency vehicles and information describing responder sites.

2.1.5 At-Risk Site Identification

The At-Risk Site Identification activity 115 provides SAFER Route planners, i.e., those persons tasked with designing and managing SAFER Route routes and the SAFER Route system, mechanisms to designate certain locations as possible destinations for emergency response units within a region of SAFER Route management. In addition to identifying a site and its location, this operation also allows the planners to provide additional descriptive information that may be useful to emergency responders about why a given site was designated. During the deployment phase, described in greater detail herein below, such additional descriptive information may be transmitted to the emergency responders.

2.1.6 Responder Site Identification

The Responder Site Identification activity 117 provides SAFER Route planners mechanisms to identify sites which are potential sources and destinations for an evacuation supported by the SAFER Route system 100. In addition to identifying a site and its location, this operation also allows the planners to provide additional descriptive information useful to emergency responders about why a particular location was designated as a haven. There are at least two classes of Responder Sites: Responder Bases (e.g., Police Stations, Firehouses, EMS Stations, etc.) and Responder Havens (e.g., hospitals and storm shelters).

Responder Site Identification is a continuous activity in which any potential responder may be identified regardless of its location, for example, a police car on patrol. The SAFER System 100 supports creation of SAFER Route routes from such dynamic locations to potential or actual incident sites.

2.1.7 Route Planner

A Route Planner module 119 provides SAFER Route planners mechanisms to define access and evacuation routes between various locations that have been identified as At-Risk and Responder sites in the SAFER Grid database 107. The Route Planner module 119 provides mechanisms, e.g., user interface and query logic, to the SAFER Route planners to query the road grid database 103 and the SAFER Grid database 107 described above to assist in the process to create candidate routes between at-risk sites and responder sites, and to analyze the routes for suitability, and to designate certain routes for incorporation into the set of SAFER Route pre-planned routes.

SAFER Route routes, such as pre-planned routes generated or selected using the Route Planner module 119 are described in greater detail herein below.

The Route Planner module 119 assists the route designers in the task of defining pre-planned routes up to and including suggesting modifications to routes proposed by the route planners or alternative routes to those proposed routes. In particular, designing routes that are the reciprocal of a planned route allows the SAFER Route system 100 to provide symmetrical routes regardless of whether a given location was originally designated as an At-Risk Site or a Responder Haven. The design of reciprocal routes is important in areas where one-way streets or limited access highways form a significant part of the road grid.

Another key factor that the Route Planner module 119 considers is the kind of traffic control signals there are available along a candidate route. In regions with significant implementations of ITS or some other form of centralized traffic control, designated routes can be chosen and pre-configured to facilitate rapid implementation of key SAFER Routes by, for example, storing the commands needed to re-program a set of traffic signals to "open" a SAFER Route and storing them along with the route definition. The methods by which the Route Planner module 119 designs candidate routes is discussed in greater detail herein below.

The pre-planned routes designed by the Route Planners using the route planning module 119 are stored in the Pre-Planned Routes database 121 in a format described in greater detail below in the section entitled "SAFER Route Abstract Model".

2.1.8 Pre-Planned Routes Database

The Pre-Planned Routes database 121 contains the routes that have been officially approved for use in the region managed by the SAFER Route system 100. As described herein below in the section entitled "Route Planning and Pre-Planned Routes", the Pre-Planned Routes database 121 is organized to allow efficient searching over a variety of criteria, such as source/destination site or proximity to an ad hoc location, for example.

In addition to their end points, Route objects in the Pre-Planned Routes database 121 also contain descriptive information such as the utility/value of the route under different conditions (e.g., time of day, day of the week, weather conditions), and the commands/steps needed to control the traffic signals along the route. Depending on the level of automation and communications capabilities in a region implementing a SAFER Route solution, the Pre-Planned Routes database 121 may be implemented in a variety of ways (e.g., on-line digital database, a set of centrally stored paper maps, loose leaf binders of maps carried in each Responder Unit).

2.2 SAFER Route Activation Phase

Figure 2:
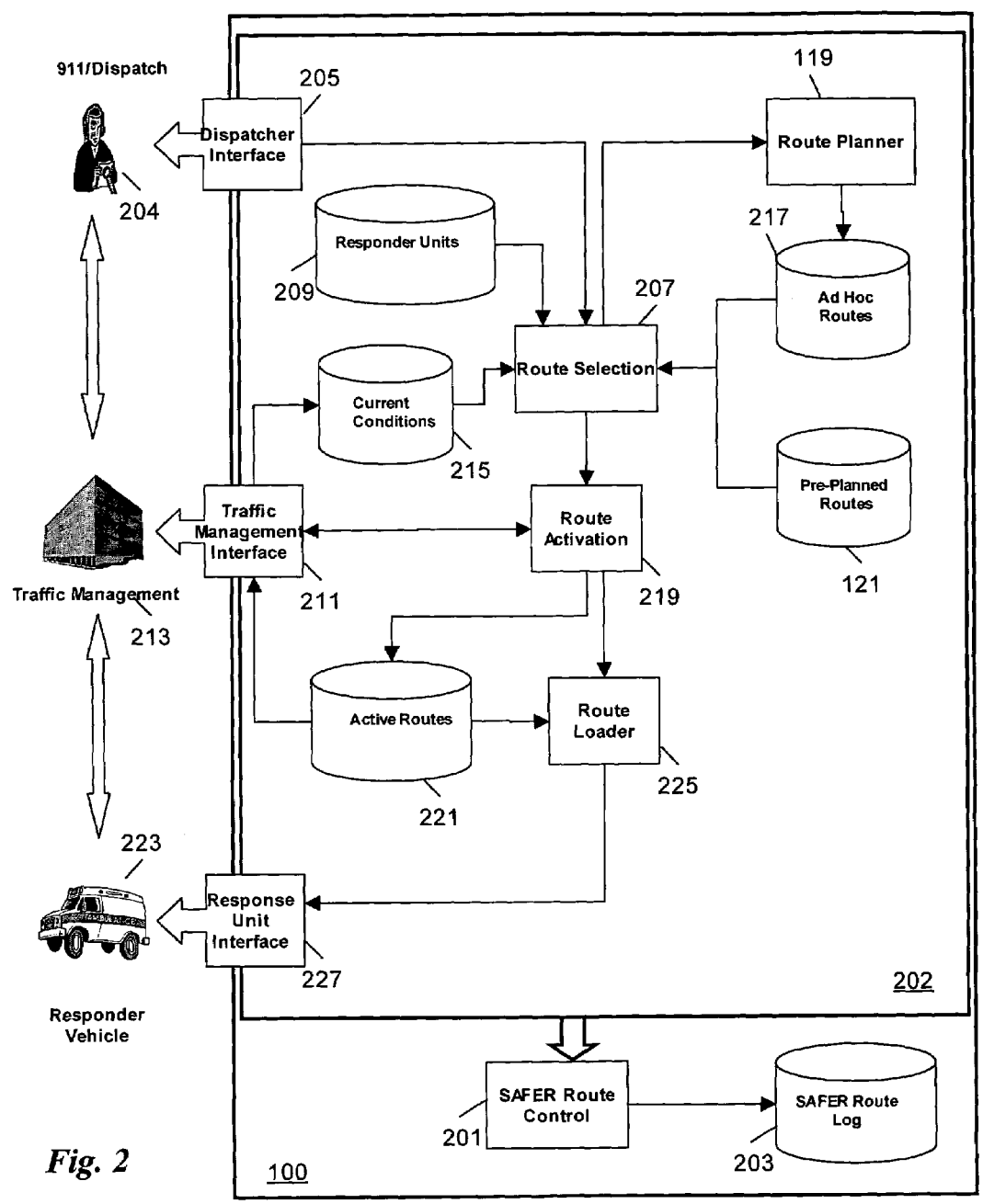
FIG. 2 is a schematic illustration depicting each of the components, interfaces and operations that are used in the route activation phase of the knowledge-based system for emergency response.

The Activation Phase is triggered by an external request for a SAFER Route system 100. The Activation Phase selects the best route for the current conditions and makes the route available to both a Responder Unit that will use the SAFER Route route and the affected traffic control organizations. FIG. 2 is a schematic illustration depicting each of the components, interfaces and operations of SAFER Route system 100 used in the activation phase, the relationship between these components, interfaces and operations, and their interaction when a situation requires the activation of a SAFER Route route.

Note that FIGS. 1 through 4 each depict the SAFER Route system 100. However, because each of the phases illustrated in these figures, respectively, involve different activities and modules, not all components are shown in each of the Figures.

2.2.1 SAFER Route Control

The SAFER Route Control module 201 oversees the behavior of the SAFER Route system 100 during the deployment and management of a SAFER Route mission. A SAFER Route mission is a mission by at least one response unit to an event at a location in a region under control of a SAFER Route system 100, for example, the dispatch of an emergency vehicle to a location at which an emergency situation has occurred. The SAFER Route Control module 201 also provides a control console to the SAFER Route coordinators who control and manage the operation of the SAFER Route Control module 201.

In one embodiment of the invention, the SAFER Route system 100 is implemented using a client-server paradigm. In that embodiment, the SAFER Route Control module 201 is implemented as a client system for use by SAFER Route coordinators. Conversely, the system functions, e.g., database access, are implemented as a server system 202. The SAFER Route server 202 contains the various databases used by the SAFER System 100 and software modules for managing the access to those databases.

The SAFER Route system 100 contains several databases and operational modules, all described in greater detail elsewhere herein. The SAFER Route Control module 201 provides the SAFER Route coordinators access to all of these databases directly. For example, certain information the SAFER Route system 100 may be obtained from non-computer resources, e.g., a voice communication. The SAFER Route coordinators would in such instances be able to use interfaces provided through the SAFER Route Control module 201 to enter that information into appropriate databases. Another example is when a call comes from a dispatcher 204 to obtain a SAFER Route route. In a preferred embodiment, that "call" would be through a computer interface. However, in other implementations, the "call" from a dispatcher 204 may be via a telephone call to a SAFER Route coordinator. In that latter case, the SAFER Route coordinator would use the SAFER Route control module 201 to cause the selection and activation of a route as described herein below.

While the SAFER Route control module 201 is illustrated and described herein as one unitary module, in alternative implementations, the various functions of the SAFER Route control module 201 may be segregated into multiple modules. For example, the functionality for entering observed traffic statistics may be in a module that is distinct from a module that is used to enter or modify proposed SAFER Route routes.

2.2.2 SAFER Route Log

The SAFER Route Log database 203 is connected to the SAFER Route Control module 201 and is used by the SAFER Route Control module 201 to record significant event and data flow that takes place during the course of a SAFER Route mission. The SAFER Route Log database 203 is used to provide an audit trail of the operation of the SAFER Route System 100 to support post-mission debriefing and analysis. The provision of an audit trail results in improvements to the information in the knowledge base and of the decision-making criteria used by the system and the operators. By closing the loop between operation-analysis and knowledge base improvement, the SAFER Route system 100 becomes a learning system that continuously improves its performance and adapts to changes in the region covered. The audit trails can also be "replayed" as part of the training of responders and system operators.

2.2.3 Dispatcher Interface

The Dispatcher Interface 205 provides a user interface to a 911/Emergency Services Dispatcher to send to a Route Selection Module 207, described herein below, the information the Route Selection Module 207 needs to select a SAFER Route route for activation. The Dispatcher Interface 205 transmits to the Route Selection module 207 information including the location requiring assistance and the identification and location of emergency unit(s) that will be responding. The SAFER system 100 may further provide information back to the dispatcher to help in deciding between alternative emergency units to respond, for example, when the route from one potential Responder Unit 223 is blocked by traffic conditions whereas a second potential Responder Unit 223 has a longer yet quicker route available.

2.2.4 Responder Unit Database

The Responder Unit database 209 contains information concerning all of the Responder units 223 that have been registered for use a SAFER Route system 100. The information includes each Responder Unit's 223 identity, contact information (e.g., call sign, network address), organization, communications capabilities (e.g., radio type, network speed), special equipment (e.g., GPS, MDT) and transportation capabilities (e.g., off-road, amphibious). In addition to the static information about the Responder Unit 223 itself, the database also contains a table which stores additional dynamic information about the Responder unit 223 when it is involved in a SAFER Route mission (e.g., route being followed, location and status of the Responder Unit 223).

2.2.5 Traffic Management Interface

The Traffic Management interface 211 provides interfaces to the SAFER Route system 100 and the SAFER Route coordinators (who control the SAFER Route system 100 via the SAFER Route Control module 201) to communicate with a local/regional traffic management control center 213. Depending on the sophistication of the interface, the Traffic Management interface 211 may be a direct computer-to-computer interaction or be as simple as a voice channel for the personnel in the respective organizations to effectively communicate status, requests for action, etc. In the latter case, information received via such a voice channel by the SAFER Route coordinators would be entered by the coordinators via the SAFER Route Control module 201.

2.2.6 Current Conditions Database

The Current Conditions database 215 is used to store information about current conditions and factors in the region that can affect traffic flow, which may be entered by Traffic Management 213 via the Traffic Management interface 211. In addition to information provided by the local Traffic Management Center(s) 213, which may include location of accidents, traffic congestion, smoke plumes blocking particular sections of the road grid, flooding, sinkholes, ruptured gas and water mains, downed power lines, time impact on traffic, etc., it also contains information about scheduled activities in the region which can also affect traffic (e.g., scheduled road/lane closures, schedules and venues for major events, prime shopping days at regional malls, parades); information which typically would be gathered from sources outside of the SAFER Route system 100. Current conditions that may be supplied to the SAFER Route system 100 may be categorized into several different classes of current conditions, e.g., conditions that block all traffic (e.g., road cut by security forces in response to a public security incident or the threat of such an incident), conditions that allow emergency responder vehicles passage at higher risk or reduced speed (e.g., road partially blocked because of traffic accident, road segment occupied by large numbers of demonstrators or people being evacuated), and conditions that permit passage only to properly equipped vehicles (e.g., if condition is toxic fumes—crews with appropriate suits and breathing equipment, if flooded roads—amphibious vehicles, if snipers on rooftop—armored personnel carrier).

2.2.7 Route Selection

The Route Selection module 207 allows a SAFER Route operator to either select a Pre-Planned Route or request that the Route Planner 119 generate a new, Ad Hoc Route to satisfy the SAFER Route request. The Route Planner 119 takes into account:

the target location for a SAFER Route mission,
the location (and type) of the Responder Unit,
current conditions,
potential events that may occur during the likely duration of the mission, and
the set of available routes The route generation request, which may originate from the Dispatcher interface 205 or the SAFER Route Control module 201, might be due to, for example, an accident blocking a pre-planned route, or a new target or responder location being requested. In addition to selecting a preferred route, one or more alternate access routes and one or more potential evacuation routes can be designated and forwarded to the requester for selection.

2.2.8 Ad Hoc Routes Database

The Ad Hoc Routes database 217 is used to store the routes that have been generated in response to a particular SAFER Route activation. In the preferred embodiment, the structure of routes stored in the Ad Hoc Routes database 217 follows the model described herein below in the section entitled "Route Planning and Pre-Planned Routes". In addition to storing this route information during a SAFER Route event that caused the generation of the route, the route is retained for potential future use, for example, to expedite subsequent activations (second or third alarms) in the near term or for incorporation into the Pre-Planned Routes database 121 after the incident has been resolved.

2.2.9 Route Activation

The Route Activation module 219 causes a selected SAFER Route to become active within the SAFER Route system 100. The Route Activation module 219 notifies the affected Traffic Management Center(s) 213 which route is being put into effect, and making the route itself available to other concerned parties by storing it in the Active Routes database 221. Notification may be through the traffic management interface 211 or, alternatively, via some other mechanism such as a telephone call from a SAFER operator who is notified of the need to make such a call via the SAFER Route Control module 201.

2.2.10 Active Routes Database

When a route has been selected and activated, the route is placed in the Active Routes database 221. The Active Routes database 221 is used to store all routes that are in use by SAFER Route Responder Units 223. In a preferred embodiment, the routes are stored in a format as described herein below in the section entitled "SAFER Route Abstract Model." The Active Routes database 221 is used not only by the Responder Units 223 themselves, but also by organizations which are or could be directly involved in supporting a SAFER Route mission (e.g., police units, EMS personnel, hospital staff).

It should be noted that while in the figures the Responder Unit 223 is depicted as just a single unit, in actual deployments several responder units would fall under the control of the SAFER Route system 100. Therefore, where this text refers to Responder Unit 223 that is meant to include all emergency response units that may be available for responding to an emergency using the SAFER Route system 100.

2.2.11 Route Loader

The Route Loader 225 causes the activated route, activated by the Route Activation module 219, to be transferred from the Active Routes database 221 to the designated Responder Unit 223 via a Responder Unit interface 227. Depending on the communications and computer capabilities of the Responder Unit 223, loading of the route may take a variety of forms including computer-to-computer communications, human uploading of the route to a Mobile Display Terminal (MDT), or voice instructions.

2.2.12 Responder Unit Interface

The Responder Unit interface 227 receives the route information from the Route Loader 225 and causes the route information to be delivered to the Responder Unit 223. As described herein above, depending on the nature of the capabilities of the Responder Unit 223, a variety of methods may be used. Furthermore, in a given region, multiple methods can be used.

2.3 SAFER Route Execution and Monitoring Phase

FIG. 3 is a schematic illustration of each of the components of the SAFER Route system 100, their relationships and their interaction during the Execution and Monitoring Phase of a SAFER Route deployment, i.e., during the execution of a SAFER Route mission.

2.3.1 Traffic Control Interface

The Traffic Control interface 301 provides mechanisms whereby the SAFER Route system 100 controls physical actuators 303 (e.g., traffic lights, highway message boards) and sensors (e.g., traffic cameras) in the regional road grid to facilitate the progress of a SAFER Route mission. In particular, the Traffic Control interface 301 is used to allow Responder Unit vehicles 223 operating under control of the SAFER Route system 100 to request certain traffic lights to "turn green" well in advance of the arrival of the vehicle, and to release the light to normal operation once the vehicle passes. In this way, traffic that could potentially delay the passage of the Responder Unit vehicle 223 is allowed to clear the road leading up to a particular traffic light before the Responder Unit vehicle 223 arrives. Depending on the degree of ITS implementation, local traffic management policies, etc., traffic control may involve direct control of these assets by the SAFER Route system 100, mediated by the Traffic Management Center 213, or conducted by some other means. For example, in areas which do not have a centralized control system for traffic control assets, the Traffic Control Interface 301 may involve, for example, voice instructions to be radioed to police units along the SAFER Route route to take manual control of key intersections. In some areas, the Responder Units 223 may have equipment on-board which allows the Responder Units 223 to override the traffic signals along the selected route for the Responder Unit 223.

2.3.2 Unit Tracker

The Unit Tracker module 305 tracks the progress of a Responder Unit 223 during a SAFER Route mission. The Unit Tracker module 305 provides the mechanisms for the Responder Unit's 223 current location, speed, direction, etc. to be plotted along the assigned route, note any deviations, allow for corrective action, etc. A variety of methods may be used (e.g., GPS, radio reports from the Responder Unit 223, sensors in the traffic network, observations made by third parties along the route) to determine this information. In regions with automated traffic control signals, the Unit Tracker 305 further provides the Traffic Control interface 301 with information required to use the Traffic Control assets 303 along the designated route to "open and close" the SAFER Route as the Responder Unit 223 approaches and leaves intersections under control by the SAFER Route system 100.

2.3.3 Route Update

The Route Update module 307 is used to modify or augment a currently active SAFER Route route. The Route Update module 307 may be used, for example, by a SAFER Route coordinator to respond to unforeseen conditions affecting the current route or an alternative route (e.g., an accident has been cleared).

2.4 SAFER Route Deactivation Phase

Once a SAFER Route mission has been concluded or aborted, the corresponding route is removed from the Active Routes database 221, use of traffic sensors and actuators is returned to regional Traffic Management 213, and log entries are finalized in the SAFER Route log 203.

2.5 SAFER Route Administration Phase

There are a number of administrative components that support the on-going operation and maintenance of the SAFER Route environment, including post-incident debriefing, personnel training, and system improvement. FIG. 4 is a schematic illustration of these components and their relationship to one another.

2.5.1 Database Access

Each of the main system databases 401a and 401b provides the SAFER Route system 100 database access modules 403 to allow the SAFER Route system 100 to make ad hoc querying of the database contents, to enter new information, to modify existing information, and to delete information, etc. (Note: databases 401a and b may be any of the various SAFER Route system 100 databases described anywhere in this document regardless of whether shown in FIG. 4 or not.) In addition to these operations, other database-specific operations are possible. Two of these operations are described in the following sections.

2.5.2 Event Posting

The Event Posting module 405 allows external events, which may have an impact on traffic flow, to be entered into the Current Conditions database 215. The information associated with these events include items such as a description of the event, the part of the road grid affected, the date/time the impact will occur, the type of event (e.g., one-shot, certain fixed days, periodic), etc., and may include both events that happen before a mission is started and during an ongoing mission.

2.5.3 Route Promotion

The Route Promotion module 407 supports analysis of the SAFER Route routes that were dynamically generated in support of a SAFER Route mission. Based on the Routes themselves and the log entries, staff using at SAFER Route system 100 can promote some of these Routes (possibly modified/refined) into the official, approved Pre-Planned Routes database 121.

2.5.4 Log Analysis

The Log Analysis module 409 supports the analysis of the SAFER Route Log database 203 in order to provide post-incident debriefing, satisfy regulatory requirements, identify trends or patterns, etc.

2.5.5 Reporting

The Reporting operation 411 allows periodic or ad hoc reports to be generated from any of the SAFER Route databases 401 according to various criteria. In particular, a special set of reports can be generated from the SAFER Route Log database 203 to support debriefings, training and system improvement.

2.6 Network Architecture

FIG. 5a is a block diagram illustrating a possible network architecture for an implementation of a SAFER Route solution. This architecture example consists of networked computer systems for the various functions involved in designing and executing SAFER Route routes. The SAFER System Server 202, which, as described herein above, provides access to the various databases that make up the knowledge base 521 used for emergency response according to the invention, is a software system residing on a SAFER Route Server computer 501. Typically the SAFER System Server 202 and the SAFER knowledge base 521 would be stored on some form of secondary storage, e.g., a disk drive 517 that is connected to a central processing unit (CPU) 513. The CPU 513 would be able to load the requisite components into a memory 515 for execution.

FIG. 5b is a block diagram providing an exploded view of the knowledge base 521. As noted above, in one embodiment of the invention, the knowledge base 521 includes the various databases described herein, including a Road Grid database 103, SAFER Road Grid database 107, an Ad Hoc Routes database 217, a Responder Units Descriptions database 209, a Pre-Planned Routes database 121, an Active Routes database 221, a Current Conditions database 215, and a SAFER Route Log 203 database.

The SAFER Route Control module 201 may reside and execute on a separate computer 503 that is connected through a network to the SAFER Route Server computer 501. In one embodiment of the invention, the Responder Unit vehicles 223 are equipped with their own computer systems 505 on which the responder client software 507 resides and executes. The responder unit computer systems 505 are equipped to communicate wirelessly to the SAFER Route Server computer 501. This communication may be via the Internet. Similarly, the Traffic Management Centers 213 are equipped with one or more computers 509 on which the Traffic Management Client software 511 resides and executes. The Traffic Management Center 213 computers 509 are also connected via a network to the SAFER Route Server computer 501, for example, via a Web-based interface.

Each of the computer systems 501, 503, 505, and 509 are typically equipped with storage media for storing their respective computer programs and databases.

3.0 SAFER Route Abstract Model

In a preferred embodiment of the present invention, the various databases of the SAFER Route system 100 that are used to store data abstractions for SAFER Route routes use a common abstract data model for modeling the routes that are used to conduct SAFER Route missions. These databases include the Pre-Planned Routes database 121, the Ad Hoc Routes database 217, and the Active Routes database 221. This section describes the abstract model upon which the SAFER Route system 100 is based. In a preferred embodiment the abstract model is implemented using a Geographical Information System (GIS). That embodiment is described, below in the section entitled "GIS Embodiment of the SAFER Route Abstract Model". The manner in which the various operational modules use the abstract model is mapped into a preferred embodiment the SAFER Route system 100, as is described in the section entitled "SAFER Route Design Phase Embodiment".

3.1 Vertices

A vertex, V, is a point on a road grid where a road or other vehicle path begins, ends or meets another road. Informally, a vertex is a street intersection, but it can also include highway on/off ramps, entrances/exits to key locations, etc. In addition to its X-Y location, a vertex has a name and a traffic control type (e.g., none, stop sign, flashing light, dumb traffic light, smart traffic light, etc.). Formally, $$V=<X, Y, \text{Name, ControlType}>$$

3.2 Arcs

An arc, A, is a road segment which directly connects two vertices and does not touch or pass through any other vertices. Informally, this corresponds to a "block". The two vertices are named $V_{start}$ and $V_{end}$ and represent the fact that traffic may only traverse the arc in the direction from $V_{start}$ to $V_{end}$. In addition to its end points, an arc also has a name, a length, L, and a function, AT, which defines the average time it takes to drive over the segment at a particular time of day and day-of-the-week. This function can also be used to model segments that are impassable at particular times (e.g., a contra-flow commuter lane or street) by setting the time to a prohibitively large value. Formally, $$A=<V_{start}, V_{end}, \text{Name}, L, AT(t)>$$

3.3 Junctions

A junction, J, defines a connection between two arcs, $A_{in}$, and $A_{out}$, such that the vertex at the end of $A_{in}$ is the same as the vertex at the start of $A_{out}$. Informally, a junction defines a legal path through an intersection. In addition to its arcs, a junction also has a function, JT, which defines the average time it takes to pass through the intersection from the first arc ($A_{in}$) to the other arc ($A_{out}$). This concept is used to account for intersections that have restrictions (e.g., no left turn even though cross traffic passes freely), different signal timings at different times of the day, etc. Formally, $$J=<A_{in}, A_{out}, JT(t)> \text{ such that } V_{start}(A_{out})=V_{end}(A_{in})$$

3.4 Routes

A route, R, from vertex $V_\alpha$ to vertex $V_\Omega$, of order N is an ordered sequence of arcs and junctions ($A_1, J_1, A_2, J_2, \ldots J_{N-1}, A_N$) such that $$V_\alpha=V_{start}(A_1)$$

$$A_{in}(J_i)=A_i$$

$$A_{out}(J_i)=A_{i+1}$$

$$V_\Omega=V_{end}(A_n)$$

The length, L, of a route R from vertex $V_\alpha$ to vertex $V_\Omega$ is given by $$L(R(V_\alpha, V_\Omega))=\Sigma_{i=1,N}L(A_i)$$

This corresponds to the actual driving distance along the route.

The Duration, D, for a route R from vertex $V_\alpha$ to vertex $V_\Omega$, at time of day, t, is given by $$D(R(V_\alpha, V_\Omega, t))=\Sigma_{i=1,N}AT(A_i, t)+\Sigma_{j=1,N-1}JT(J_j, t)$$

This corresponds to the amount of time it will take to drive this route at time, t.

3.5 Discussion SAFER Abstract Model

The SAFER Route abstract model is a representation of the local road grid as it is used by conventional civilian traffic. The SAFER Route abstract model does not attempt to model the emergency use of the road grid (e.g., cross medians, traveling the wrong way on a one way street, making "illegal" left turns, etc.) as is sometimes required by responder vehicles that are not using technology such as the SAFER Routes system 100, nor does the model attempt to model the potentially shorter travel times responder vehicles may sometimes achieve by "breaking the law". The philosophy embodied in SAFER Routes is that responder vehicles will complete their trips in shorter elapsed times, more safely, by leveraging knowledge of the dynamic traffic environment and the ability to proactively control the traffic management infrastructure along the route. In an alternative embodiment, the model used could indeed include representation of such alternative uses of the road grid.

That being said, while the automatic route creation algorithms of the preferred embodiment of the invention strictly implement this philosophy, in situations of extreme emergency (e.g., mass casualties, major infrastructure failures), human route planners have the ability to override these restrictions and can create routes to be put under control of the SAFER Route system 100 and that disregard the conventional constraints (e.g., reverse the direction of travel on a major freeway to support regional evacuations).

3.6 SAFER Route Abstract Model Example

Figure 6:
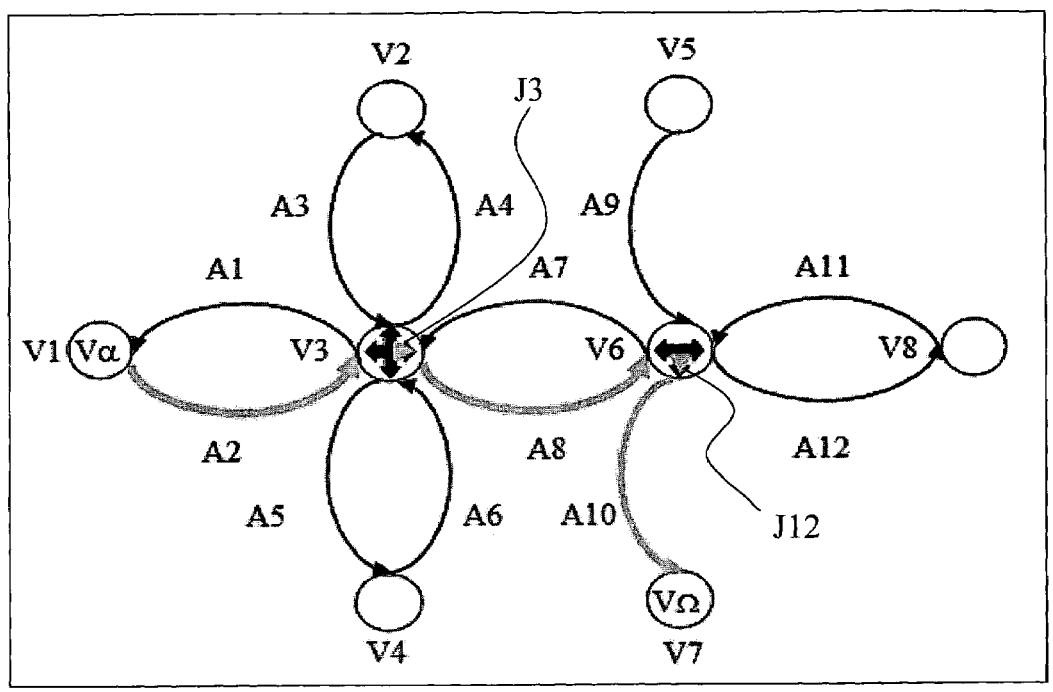
FIG. 6 is a graphical illustration of a directed graph illustrating an example 600 of the information architecture abstract model used for the implementation of a preferred embodiment of a knowledge-based system for emergency response according to the invention.

FIG. 6 is a graphical illustration of a directed graph illustrating an example 600 of the SAFER Route abstract model. The example model 600 is a model of a portion of a road grid with vertices V1-V8 and arcs A1-A12. For simplicity in the diagram, the present discussion only discusses the junctions at vertices V3 and V6 (the corresponding transit functions, JTi, are not shown). The following junctions are defined (however, not explicitly shown in FIG. 6 as several of the junctions would graphically overlap in the illustration):

J1={A2, A4} J2={A2, A5} J3={A2,A8} J4={A3,A1}

J5={A3, A5} J6={ A6, A1} J7={ A6, A4} J8={ A6, A8}

J9={A7,A1} J10={A7,A4} J11={A7,A5}

J12={ A8, A10} J13={A8, A12} J14={ A9, A7}

J15={A9,A10}J16={A9,A12}J17={A11,A7}

J18={A11,A10}

One can infer that the roads that go from V1 to V8 (via V3 and V6) and from V2 to V4 (via V3) are two way streets, the road from V5 to V7 (via V6) is a one way street and no left turns are allowed from arc A3 to arc A8, and no U-turns are allowed. The shaded arcs A2, A8, A10 and junctions J3, J12 indicate a route R(V1, V7)={A2,J3,A8,J12,A10} of order 3.

4.0 GIS Embodiment of the SAFER Route Abstract Model

In a preferred embodiment, the present invention may be implemented on top of a computer-based Geographical Information Systems (GIS). In such an implementation, the SAFER Route Abstract model is mapped into the ESRI ArcView system. Among other components, ArcView includes the ArcMap display application and the ArcCatalog data management application. A complete description of the ESRI ArcView system can be found in T. Ormsby, supra, which is incorporated herein by reference. The more generally used terms may be found in the glossary at the end of this document.

4.1 Domains

An ESRI geodatabase system supports the definition of a constrained set of values ("domain") for a given text field type. The SAFER Routes system 100 uses the following domains:

ArcType

The type of traffic control device at the end of an Arc. Currently the following values are used (other types can be easily defined):
None—no control device present
Stop—stop sign
Dumb—locally controlled light
Flash-R—flashing red light
Flash-Y—flashing yellow light
RR—railroad grade crossing
Smart—centrally/remotely controlled light
Drwbrdge—drawbridge
TollBth—toll booth Direction The general direction traffic travels over a given Arc. One of the following:
N—northbound
S—southbound
E—eastbound
W—westbound SignalType The type of signal at an Intersection. These are analogous to the ArcType values. The values for this field can be customized for a particular implementation. Examples are starred (*) in the following:
Local—locally controlled light ("dumb")
RR—railroad crossing with automated gates
ATMS*—Light Rail Smart Signal
RCTSS*—Bus Route Priority Smart Signal 4.2 Feature Classes The ESRI software provides a mechanism to define feature classes to be used by a particular application. A feature class is a collection of geographic features with the same geometry type (such as point, line, or polygon), the same attributes, and the same spatial reference. For the SAFER Grid database 107, the Feature Classes are defined as follows:

Vertices are represented as a Point feature class called Intersections (A point feature in ESRI software is a digital representation of a place or thing that has a location but no area). In addition to the OBJECTID and SHAPE (x,y location on the map) fields that all ESRI Point feature classes have, an Intersection has the following fields:
Name—text field, a name based on the cross streets (e.g., Main@Richmond)

Traffic signals are represented as a Point feature class called Signals. In addition to the OBJECTID and SHAPE (x,y location on the map) fields, a Signal has the following fields:
SignalID—text field, a unique identifier used by the traffic control management system to designate this particular signal in its control system
Intersection—text field, name of the intersection
SignalType—text field from the SignalType domain described above Arcs are represented as ESRI Polyline feature classes called RouteSegs. The start and end points of each polyline is constrained to be coincident with an Intersection point as defined above. Since a given two-way street has arcs going in opposite directions to/from a given pair of Intersections, there is a RouteSegs_XXX feature class for each of the four main compass directions (i.e., RouteSegs_North, RouteSegs_South, RouteSegs_East, RouteSegs_West).

In addition to the OBJECTID, SHAPE (start point, end point) and SHAPE_Length (length of the polyline) fields that all ESRI polylines have, a RouteSegs_XXX feature class has the following fields:
StreetName—text field, name of the street that the arc models
BlockNumber—long integer, number of the block that the arc models. Note some arcs name span multiple "blocks" depending on the numbering scheme and the granularity of the modeling
Direction—text field from the Direction domain
IntersectionType—text field from the ArcType domain SignalID—text field, identifier for the signal as used by the (regional) traffic control system At Risk Sites and Responder Sites are represented as ESRI Point feature classes. There is a point feature class for each kind of site that is modeled (e.g., schools, hospitals, fire stations). It is part of a SAFER Route deployment to identify which classes of sites to model and which individual locations to add to a given feature class. In a phased deployment (which would be the case for a large, urban area), the highest risk sites (schools, malls, sports venues) and major trauma hospitals would probably be the first to be modeled and implemented.

In addition to the OBJECTID and SHAPE (x,y location on the map) fields, each Site feature class has the following fields:
- Name—text, colloquial name for the Site (e.g., Waltrip High School)
- AddressNumber—integer, number portion of the street address
- StreetName
  text, name portion of the street address A Route is represented as an ordered sequence of Arcs in a Polyline feature class that is called by the name of the route (e.g., Hermann Hospital via I-45). As required by the abstract model, the Arcs are such that
- the starting point of the first Arc is coincident with the Intersection point associated with the Site selected as the beginning of the Route;
- the end point of the last Arc is coincident with the Intersection point associated with the Site selected as the destination of the Route; and
- for each pair of consecutive Arcs in the ordered sequence, the ending point of the first Arc is coincident with the starting point of the second.

The feature class for the route has the same fields as the RouteSegs_XXX feature classes. And each Arc must have identical values to the corresponding arc in one of the four RouteSegs_XXX feature classes.

4.3 Database Tables

These tables are used to provide non-geometry based information to the SAFER Route solution.
- ArcTimes is used to store the information that is used to implement the AT function for each Arc. It has the following fields:
  - ArcObjectID—ESRI OBJECTID for the corresponding arc
  - StartTime (Day, HH:MM)
  - StopTime(Day, HH:MM)
  - TravelTime—the average time it takes to travel along the arc between StartTime and StopTime
- JunctionTable is used to represent Junctions. For each vertex there are entries for each incoming Arc (Route Segment) and its legal exit arcs. It has the following fields:
  - JunctionID—unique identifier for this Junction
  - VertexObjectID—ESRI OBJECTID for the corresponding Vertex
  - InBoundArcRouteSegFeatureClass—i.e., the feature class to which the incoming Arc belongs.
  - InBoundArcObjectID—ESRI OBJECTID for the corresponding Arc
  - OutBoundArcRouteSegFeatureClass—i.e., the feature class to which the outgoing Arc belongs.
  - OutBoundArcObjectID—ESRI OBJECTID for the corresponding Arc
- JunctionTimes is used to store the information that is used to implement the JT function for each Junction. It has the following fields:
  - JunctionID—ESRI OBJECTID for the corresponding Junction
  - StartTime (Day, HH:MM)
  - StopTime(Day, HH:MM)
  - TransitTime—the average time it takes to pass through the junction between StartTime and StopTime 4.4 ESRI Map Documents In the preferred embodiment, the Road Grid database 103 for an area being modeled is contained in an ArcView geodatabase. The Road Grid database 103 is established using a coordinate system that is compatible with the bulk of the existing GIS information that is being used by the local governments GIS systems. These entities are the source for background information (GIS shapefiles, feature classes, geodatabases, etc.) that describes the area (roads, highways, waterways, railroads, etc.).

The SAFER Grid database 107 of the SAFER Route system 100 is a set of specifically defined ESRI domains, feature classes, and associated data tables stored in a separate ESRI geodatabase that is used to model and implement the SAFER Route system 100 solution.

The SAFER Route Design Phase is built within an ESRI ArcMap document created for this purpose ("RouteDesign.mxd"). There is a separate master ArcMap document ("RouteTracking.mxd") that forms basis for the Activation and Execution/Monitoring Phase. The master document is opened and then saved with a name descriptive of the SAFER Route Mission to be executed (e.g., "WaltripEvacuation—25Jan. 2004.mxd"). All subsequent interaction in the Activation and Execution Phases is managed with this mission-specific map document.

5.0 SAFER Route Design Phase Embodiment

Figure 7:
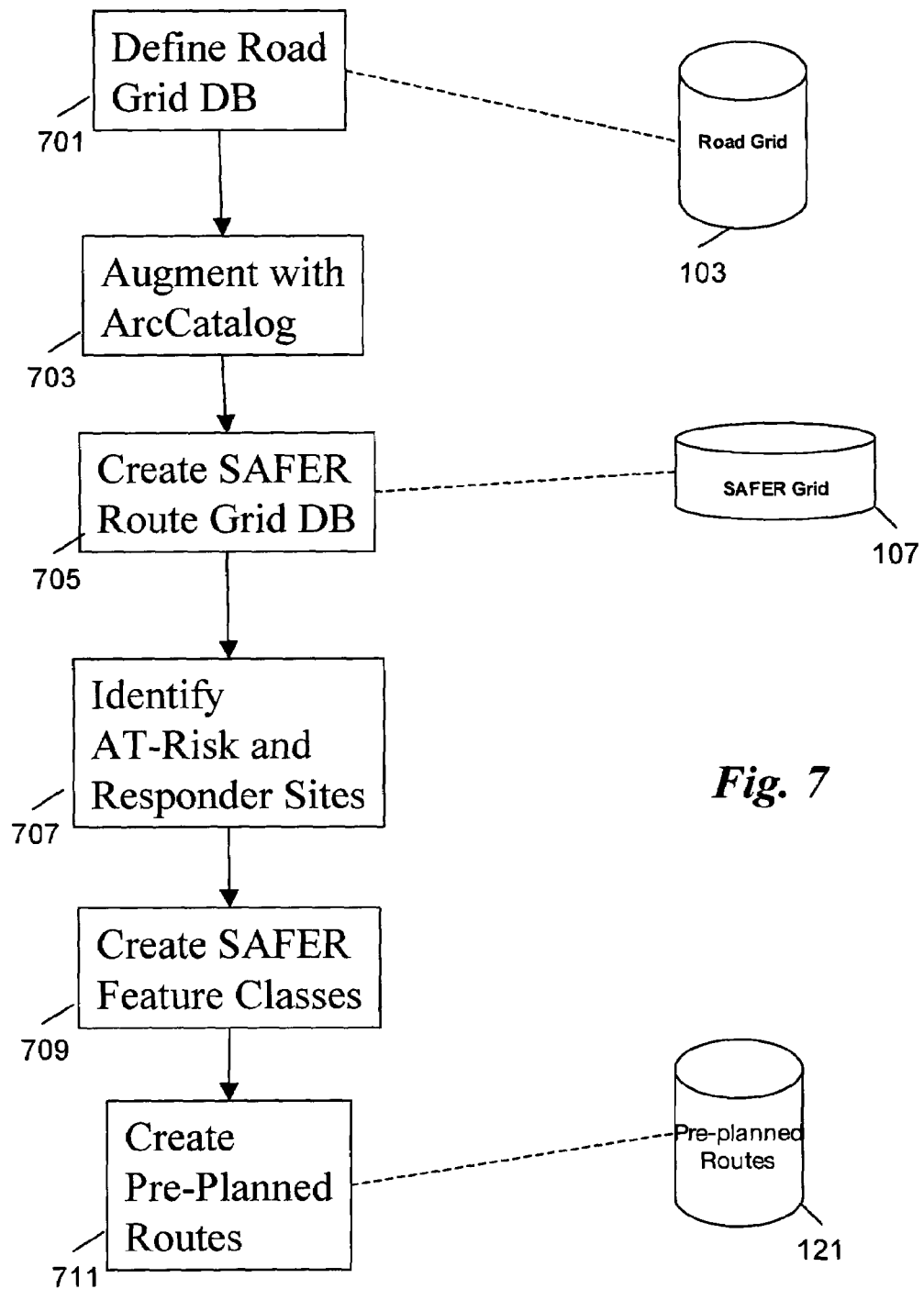
FIG. 7 is a flow chart depicting an exemplary workflow during the design phase.

The section above entitled "SAFER Route Abstract Model" contains a description of data model objects that are used in the SAFER Route Design Phase as illustrated in FIG. 2 and described in the accompanying text. This section describes the details of the major components of the Design Phase and how those components of the Design Phase operate and interact with the data objects used during the design phase. FIG. 7 is a flow chart depicting an exemplary workflow during the design phase.

5.1 Road Grid

A first step is to create or obtain the Road Grid database, step 701. Most municipalities of any size have GIS departments that have created at least a rudimentary Road Grid database 103. Such a Road Grid database 103 may, for example, be embodied in an ESRI ArcView geodatabase. At a minimum, the Road Grid database 103 contains information on all major roads, state highways, and US Interstate highways. The Road Grid database 103 typically also contains information on minor roads, railroads and waterways. More comprehensive systems identify key municipal buildings, parks, industrial areas, etc. The Road Grid database 103 of a municipality is generally available from the municipal authorities for a nominal fee.

For SAFER Route purposes, regardless of the level of detail, the background information that is maintained by the municipal authorities will be considered to be the "Road Grid Database". The set of shapefiles, feature classes, etc., that is used as the foundation for a SAFER Route implementation is loaded into the Road Grid database 103 using ArcCatalog or converted into to an ESRI geodatabase if necessary, step 703.

5.2 SAFER Grid Database

Figure 8:
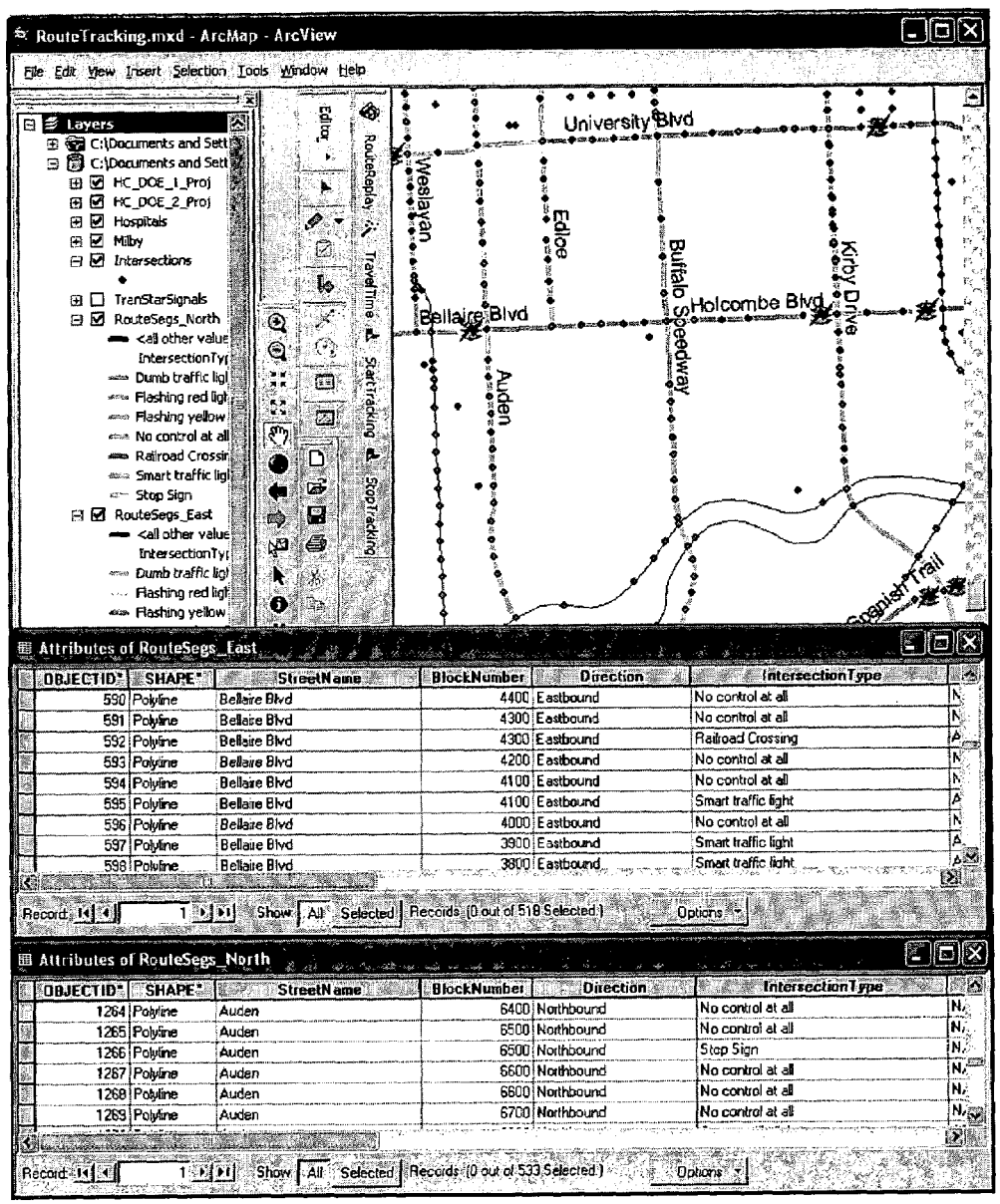
FIG. 8 is a screen shot illustrating an example road grid database augmented according to the invention.

After the road grid has been established as an ESRI geodatabase, the Road Grid database 103, the next step is to create another geodatabase with ArcCatalog and add the required feature classes that comprise the SAFER Grid database 107, step 705. In a sense, step 705 entails adding the SAFER grid feature classes to the .mxd file that is the Road Grid database 103 and subsequently saving that resulting file as the SAFER Grid database 107. While a comprehensive database, which includes every road, alleyway, building, vacant lot, etc., would be desirable to deploy the SAFER Route system 100 in a given area, it is not necessary. A phased approach which focuses initially on key At Risk, Base and Haven sites and the road grid in the general vicinity of those sites is adequate for an initial deployment. Thus, an initial deployment phase is to define At-Risk, Base and Haven sites, step 707. Once these locations and likely routes have been identified, the deployment can focus on creating the SAFER Grid feature class objects to augment the base Road Grid database 103, step 709. FIG. 8 is a screen shot illustrating an example of a Road Grid database 103 augmented with some of the SAFER Grid database 107 components.

At a minimum, the step of creating SAFER Feature classes in the SAFER GRID DB requires that the following feature class objects are created and loaded into the ESRI project which constitutes the SAFER Grid DB 107. Creating and loading the feature class objects may be performed manually by using the ESRI map editing tools, or by programmatic means (e.g., scanning paper maps, analysis of digital maps), or a combination of both. The ESRI map editing tools are described in greater detail in *ArcGIS 9: Editing in ArcMap*, ISBN 1-58948-100-3, ESRI 2004, which is incorporated herein by reference.

In a preferred embodiment, the creation and loading step 709, causes the following feature classes to be created and loaded:

Intersection feature class with fields described above
Intersection Points (with associated values for fields) as follows:
  one intersection point wherever a road crosses another road at grade (ignore overpasses/underpasses)
  one intersection point at each road/railroad crossing at grade
  one intersection point at the end of each road (e.g., dead end, cul de sac)
  one intersection point at driveways/entrances of designated Sites and other locations of interest
  for limited access roads, one intersection point where each highway exit ramp starts, one intersection point where the exit ramps join the access road, one intersection point where the entrance ramps starts on an access road, and one intersection point where the entrance ramp joins the limited access highway
Signals feature class with fields described above
Signal Points (with associated values for fields) at each relevant Intersection Point as follows:
  one point for every stop sign
  one point for every railroad crossing
  one point for every traffic control signal
RouteSegs_XXX feature classes (North, South, East, West) with fields described above.
RouteSegs_XXX Polylines to model each road which should be considered for use in a SAFER Route. Each block of a road is modeled by creating an Arc in the feature class corresponding to the direction traffic normally flows. For two way streets, this means that an Arc must be defined in the two appropriate corresponding feature classes—one for each direction the traffic can travel. One way streets need only one set of Arcs.

Note that as a street proceeds, the Arcs that are defined may need to move to a different RouteSeg_XXX feature class if the direction of the street changes, for example from generally Northbound to generally Westbound. For blocks that run precisely at a 45 degree angle the main directions, they can be modeled in either feature class (e.g., a segment running north-west could be modeled either in the RouteSeg_North or RouteSeg_West feature class). Arcs (with associated values for their fields) must be created as follows:
  every Arc begins at a defined Intersection Point
  every Arc ends at a defined Intersection Point
  an Arc does not "skip" an Intersection Point, i.e., arcs have a minimal length
  Arcs follow the path of existing roadways
At Risk and Responder Site feature classes for the places of interest with the fields described above.
Site Points in the corresponding feature classes for the prospective source, rescue and destination locations in the area being modeled.

5.3 Route Planning and Pre-Planned Routes

After the SAFER Grid database 107 feature classes have been defined, the next step in a deployment is to create a set of Pre-Planned Routes between Responder Base Sites and At Risk Sites, and between At Risk Sites and Responder Haven Sites, step 711. Again, in a large, urban setting the initial set of routes would be chosen to protect the key At Risk Sites.

In the preferred embodiment, the Pre-Planned Routes database 121 is composed of two main components: an ESRI polyline feature class PrePlannedRoutesIndex, which provides an index to each of the currently defined Pre-Planned Routes, and a collection of feature classes each of which stores a particular Pre-Planned Route.

Each Pre-Planned Route is stored as a specific Route feature class (as described above) that is given a specific human-identifiable name indicative of its source and destination.

The members of the PrePlannedRoutesIndex feature class are themselves polylines, each of which corresponds to an entire Pre-Planned Route. Each polyline in the index is the union of all of the route segments in a given Pre-Planned Route in the order in which the underlying route segments appear in a Pre-Planned Route. That is, an index polyline begins at the $V_{start}$ of the first route segment ($V_\alpha$) of the corresponding route, proceeds from $V_{end}$ to $V_{start}$ for each succeeding/intervening polyline segment comprising the Pre-Planned Route, and ends at the $V_{end}$ of the last route segment of the corresponding route ($V_\Omega$).

A PrePlannedRoutesIndex polyline can be created either by manually tracing a Pre-Planned Route using the ESRI ArcMap Editor or by a VBE procedure which creates the index polyline programmatically from a specified route.

In addition to the standard ESRI polyline attributes of OBJECTID, SHAPE, and SHAPE_Length, the PrePlannedRoutesIndex feature class contains the following attributes:
  RouteName—text field, the name of the feature class for a particular route In the SAFER route context, the starting point ($V_\alpha$) for an ingress route is typically a Responder Base and the end point ($V_\Omega$) is an At Risk Site. For an evacuation route, the starting point is typically an At Risk Site and the end point is a Responder Haven. Depending on the needs of a given deployment, routes can be created either automatically or manually with system assistance.

5.3.1 Automatic Route Creation

The SAFER Grid model has the properties of a directed graph, and there are a number of well-known algorithms, e.g., A*, Dijkstra's Single Source Shortest Paths, Floyd's algorithm to find the shortest paths beween all pairs of nodes in a directed graph, that can be used to generate paths through a directed graph and/or select an optimal one. The A* algorithm is described in A. Barr and E. Feigenbaum, *The Handbook of Artificial Intelligence*, Volume 1, pp. 64-66, Morgan Kaufman, 1981; Dijkstra's Single Source Shortest Paths algorithm is described in E. W. Dijkstra, *A Note On Two Problems In Connection With Graphs, Numerische Mathematik* 1 p269-271, 1959; and Floyd's algorithm is described in Robert W Floyd, Algorithm 97 (*Shortest Path*), *Communications of the ACM*, Volume 5, Number 6, pp. 345, 1962, each of which is incorporated herein by reference. In order to support automatic route creation, the SAFER Grid database 107 has sufficient information to allow a route creation algorithm to rank the proposed routes. Several different criteria can be used depending on the maturity of the deployment in a particular location:

The simplest criterion to use is to rank a proposed route based on the value of N, the number of arcs in the route. This corresponds to selecting a route that transits the smallest number of city blocks—regardless of their length. This criterion does not require any traffic statistics to be used, but it does not generate uniformly good routes.

A more useful criterion is to use the value of L, driving distance along the sequence of arcs that comprise the route. This criterion does not require traffic statistics either, but it does require a reasonable accurate base map so that true distances can be determined when creating the polylines which model the street Arcs.

The next level of sophistication is to use the travel-time tables that are based on actual traffic statistics. In this case, the Duration of the route, D, the projected time it will take to traverse the route at a given time of day can be used.

The most comprehensive criterion is to use the Duration metric with a dynamic implementation of the AT and JT functions. In this case, rather than use a simple database look-up to determine the projected travel time, the functions consult the Current Conditions database to see whether the values in the SAFER Grid database need to be overridden.

Regardless of the criterion used, a new polyline feature class is created for each generated route, given a descriptive name, the designated segments and their associated data are created as polylines in the proper order from source to destination, and the corresponding entry is created in the PrePlannedRoutesIndex. Thus, for example, if routes are to be generated between Waltrip High School and LBJ Hospital, a feature class is created for each such route and is given a descriptive name to differentiate it from the others, e.g., "Waltrip to LBJ via I-610" or "Waltrip to LBJ via 43$^{rd}$/Crosstimbers".

Automated route creation provides for excellent primary routes for a given time of the day. However, some manual intervention is often required to identify alternate or secondary routes, especially if certain portions of a primary route are potentially subject to non-time-based disruptions (e.g., flooding, railway accident.).

5.3.2 System Assisted Route Creation

Knowledge of local conditions, risks, historical perspective, etc. are used by the Route Planner module 119 to generate very effective alternate/secondary routes between key At Risk Sites and Responder locations. The SAFER Route Control module 201 also provides editing tools to allow for manual intervention in the creation of routes. The system editing tools of the SAFER Route control module 201 are based on the ESRI ArcMap editor and provides a mechanism by which traffic engineers or other personnel familiar with an area may create new Route feature classes by identifying prospective travel paths, determining their characteristics (e.g., total driving distance, predicted travel time), and then designating which ones to be added to the SAFER Grid database of Pre-Planned Routes 121. This is done by creating an entry in the PrePlannedRoutesIndex feature class as described herein above.

6.0 SAFER Route Activation Phase Embodiment

This section describes the details of the major components which comprise the SAFER Route Activation Phase and how they operate and interact.

In the preferred embodiment, which is an ESRI-based implementation, the activation and execution of a SAFER Route journey is managed with a separate ArcView map (".mxd" file) for each route that will be run. Multiple simultaneous SAFER missions are managed via separate maps. A combined view of the overall environment can be provided by using the ESRI server-based GIS products.

The map file is augmented with the SAFER Route software and geodatabase entities. In its base state, the "route tracking map" contains all of the background information that is in the standard Road Grid database 103 along with the Current Conditions database 215. As situations in the region under SAFER Route protection change and routes are selected, activated and tracked, additional map layers are added to the base state or removed as routes are deactivated. A feature class has geometry and attributes, and exists independent of any map (.mxd) file. A layer describes the way a feature class or a shapefile is displayed on a particular map. For example, the same feature class can be displayed on one map as a three-pixel-wide solid red line and on another map as a 1-pixel-wide black dashed line.

In both the Activation and Execution Phases, the SAFER Route system 100 must interact with a number of different entities involved in emergency response and traffic management. In most of the environments where the SAFER Route system 100 can be employed, these entities currently have computer-based systems that can support the operation of the SAFER Route system 100. The details of these systems differ from municipality to municipality and even from department to department (e.g., police vs. fire) in the same municipality. Therefore the required interfaces to these systems must be left somewhat abstract. However, in each case the minimum necessary information required by these interfaces is specified.

The interface to and the capabilities of the equipment on the Responder Unit vehicles 223 is especially important in this regard because a critical component of the SAFER Route system 100 requires real time positional information from the Responder Unit vehicle 223 while it is underway. Because of the differences in the capabilities of the various Responder Unit vehicles 223, alternate implementations of the Responder Unit interface 227 are provided to accommodate these differences. These alternate implementations allow for certain functions to reside either in the vehicle's on-board computer system, or on the main SAFER Route computing infrastructure. Where this difference is important, the term "SAFER Route server" is used herein to refer to the computer center/office-based system and "SAFER Route client" to refer to the on-board system.

6.1 Current Conditions Database

The Current Conditions database 215 is used to provide real-time modification to the Route Selection and Route Update operations. It provides a way for the Traffic Management infrastructure to indicate changes to the "steady state" SAFER Grid. In addition to information provided by the local Traffic Management Center(s) 213, which may include location of accidents, traffic congestion, time impact on traffic, etc.), the Current Conditions database 215 also contains information about scheduled activities in the region which can also affect traffic (e.g., scheduled road/lane closures, schedules and venues for major events, prime shopping days at regional malls, parades). These updates are made on an on-going 24×7 basis.

In the current implementation, the Current Conditions database 215 is composed of an ESRI feature class called CurrentIncidents and a database table called CurrentTimes:

CurrentIncidents is a Polygon feature class used to mark the location of the primary cause of a disruption to traffic flow. It can be used to represent a traffic accident, a flooded road, derailed train, etc. The information is used primarily to inform (human) users of the system of the nature a traffic disruption.

In addition to the OBJECTID and SHAPE (x,y location on the map), a CurrentIncident has the following fields:
  IncidentID—a unique serial number associated with the incident
  IncidentType
  StartTime—the time of day the incident occurred
  EstClrTime—the time of day when the traffic disruption is estimated to be cleared CurrentTimes is a table that is used to specify the estimated times for a vehicle to travel along an arc or through a junction under the current traffic conditions. It has the following fields:
  IncidentID—as above
  ObjectType—Arc or Junction
  ObjectID—if an Arc, the ESRI OBJECTID of the entity affected; if a Junction, the JunctioniD
  RouteSegXXX—if an Arc, the name of the corresponding RouteSegXXX feature class
  CurrentTime—current estimate of the elapsed time to transit through an entity. Note that this may shorter than the nominal time (AT, JT) if extraordinary measures have been taken (e.g., closing a road to civilian traffic)

6.1.1 AT(t) and JT(t) Implementation

With the preceding definitions, the following pseudocode outlines how the Arc Travel Time functions (AT) are implemented in a preferred embodiment, as illustrated in Table 1:

TABLE 1

```
function time AT( arc A, time_of_day TOD ) {
    if( a CurrentTimes entry for arc A exists) {
/* a CurrentTimes entry exists */
        return CurrentTime for A
    } else {
/* look for TravelTime at time TOD */
        AR = first row AT table for arc A
        while( AR != NULL) {
/* loop until we find an entry */
            if( AR.StartTime < = TOD and AR.StopTime >= TOD)
            {
                return AR. TravelTime
            } else {
                AR = next row of AT table for arc A
            }
        }
        error( "Can't find arc ", A );
    }
}
```

The Junction Transit Time functions (JT) is implemented in a similar manner.

6.2 Coordination with Outside Entities

The nature of the connections between the SAFER Route system 100 and the local emergency response and traffic management organizations that use SAFER Route system 100 will differ somewhat depending on the number of municipalities involved, the equipment on a given (classes of) emergency vehicles, the radio systems being used, etc. In addition to the minimum information described here, access to general information concerning the participating entities (emergency contact information, chain of command, etc.) is assumed to exist either via public access to the World Wide Web or to municipal/regional emergency response infrastructure.

6.3 Emergency Dispatch

In a region that does not yet have an integrated 911 dispatch system, each municipality and responder organization (police, fire, EMS) will require a separate interface into the SAFER Route system 100. While a completely automated connection is possible in such a situation, the cost may be prohibitive. Even in an area which has an integrated 911 system for taking emergency calls, the assignment of a specific Responder Unit vehicle 223 may be done outside of the 911 system by the responding organization itself. It is only in areas with an integrated 911 call taking, dispatch and assignment of specific vehicles that a fully automated connection is possible. Therefore, in most cases, the Responder Unit interface 227 utilizes some form of human intermediation.

Regardless of how the interface is provided, the nature of the information that passes include the following:
  Dispatchinterface
    AssignedOrganizationName—text field, name of responding organization
    AssignedUnitID—text field, organization's identification of unit assigned
    UnitCurrentLocation—coordinates field, current location of unit (may not be at home base)
    RescueLocation—coordinates field, location to which the unit is being dispatched
    EvacuationLocation—coordinates field, location to which the unit will evacuate victims (if known)

When this information is received into the SAFER Route system 100, it is passed on to the Route Selection module 207.

6.4 Route Selection and the Active Routes and Ad Hoc Routes Databases

Figure 9:
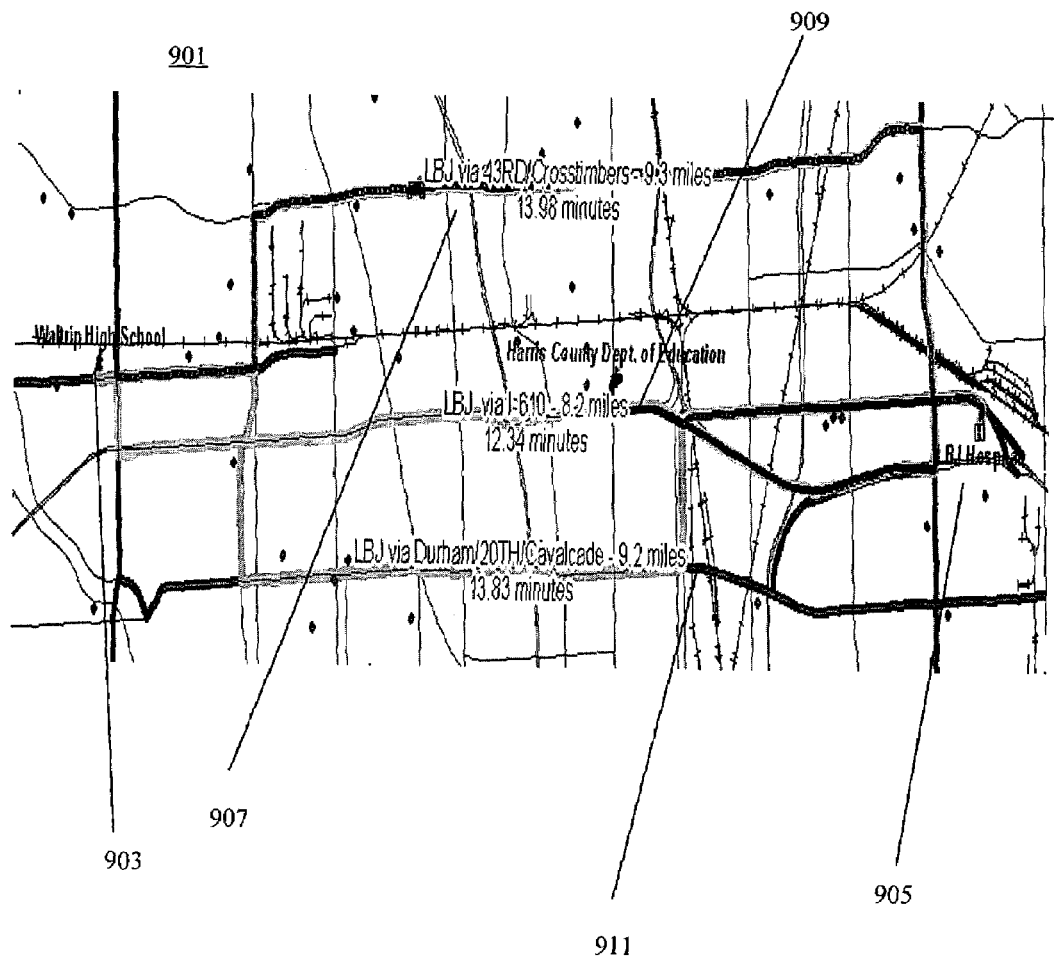
FIGS. 9 is a screen shot of an example of a route selection display of the SAFER Route control module illustrated in FIG. 2.

The Route Selection activity is initiated by receiving a message from the 911/Dispatch Center requesting SAFER Route support for a Responder Unit mission via the dispatcher interface 205. In automated operation, a candidate route is selected by computing the duration, D, for all the pre-planned routes that have the required start and end locations as indicated from 911/Dispatch and choosing the one with the shortest projected travel time (taking into account the information in the Current Conditions database 215). Before a route is finalized for activation, the SAFER Route system 100 displays the candidate route to the SAFER Route operator for final approval. FIG. 9 is a screen shot of an example of the Route Selection display of the SAFER Route control module 201. The Route Selection display is a graphic display of a map 901 on an operator screen.

In the example of FIG. 9, an evacuation is contemplated from a high school 903, Waltrip HS, to a hospital 905, LBJ Hospital. The Route Selection module 207 has retrieved three candidate routes 907, 909, and 911 from the Pre-planned Routes database 121. Alternatively, if no pre-planned routes were found for an evacuation from Waltrip to LBJ, the Route Selection module 207 would have called on the Route Planning module 119, to create some ad hoc routes, which would be stored in the Ad Hoc Routes database 217.

In system-assisted route selection, the SAFER Route operator reviews the relevant routes by displaying them on the map 901 and then selects the most appropriate route. The SAFER Route system 100 supports this operation by labeling each route with both its L (length) and D (estimated duration) values along with the name of the route.

If no pre-planned routes are available or if the SAFER Route operator does not want to approve any of the candidates, the Route Planner operation 119 is invoked to generate a suitable Ad Hoc Route for entry into the Ad Hoc Routes database 217. In this case, the automated Route Planner 119 uses D values that are modified by the Current Conditions database 215 so as to get the best route under the prevailing situation. Again, as before, system-assisted route creation can also be done. As these Ad Hoc Routes are being generated, they are stored in the Ad Hoc Routes database 217. In a preferred embodiment, these are stored as ESRI polyline shapefiles.

The Ad Hoc Routes database has the same structure as the Pre-Planned Routes database described above. In the current embodiment, the routes themselves are stored as ESRI polyline shapefiles following the Route feature class schema described above. And an AdHocRoutesIndex feature class, analogous to the PrePlannedRoutes feature class is used to provide uniform access.

Regardless of how the final route is chosen, the route is then added to the Active Routes database 221. The active routes database 221 is implemented by adding the selected Route feature classes to the current map file (*.mxd) using the ArcView "Add Data" command.

At the same time as a route is designed and selected for a SAFER Route mission to an incident location, an evacuation destination and a route to that evacuation destination may be identified and also stored to expedite egress travel once the responder unit reaches the incident location.

6.5 Route Activation

In order to activate a route, the map layer that resulted from adding the Route feature class to the current map is selected as the current map layer. When the GPS unit on a Responder Unit vehicle 223 begins to transmit position information, the SAFER Route Unit Tracker module 305 is started. The operation and implementation of the Unit Tracker module 305 is described in the Execution Phase Embodiment section below.

6.6 Responder Units

In the Activation Phase, most of the interaction between the SAFER Route system 100 and Responder Units 223 revolves around identifying the particular Responder Unit 223 that will be dispatched, locating it on the SAFER Grid 107 and selecting the set of routes to be used, and then sending the route information to the Responder Unit 223 that is responding. The components involved in this and their implementation are as follows:

6.6.1 Responder Unit Database

The Responder Unit database 209 is implemented as a pair of tables which contains the information necessary to establish contact with a given Responder Unit vehicle 223 and initiate the route selection process 207. The first of these contains the static information which describes the capabilities of each responder vehicle known to the SAFER Route system. The second contains the dynamic information that is related to the assignment of a Responder Unit vehicle 223 to a particular mission.

Responder Unit Descriptions

The details will differ depending on the radio systems, on-board computer equipment, location devices, etc. that are used in a particular area, and the nature of some of the fields may change (e.g., text vs. number, single vs. multiple values per field, etc.), but at a minimum, the following fields are required:

ResponderUnitID—unique identifier

UnitType—text field (constrained), ambulance, fire engine, police cruiser, etc.

OrganizationName—text field

OrganizationUnitID—text field, identifies unit using the organization's terminology CarryingCapacity—number OffRoadCapabile—yes/no flag AmphibousCapable—yes/no flag VoiceContactInfo—depends on local system—cellular, radio, etc.

NetworkCapable—yes/no flag

NetworkContactInfo—TCP/IP address, VPN credentials, etc.

LinkSpeed—number (bits/sec)

OnBoardComputer—yes/no flag

OnBoardGPS—yes/no flag

Note that this schema allows for the fact that a Responder Unit vehicle 223 may not have a computer, a GPS unit, or even network link on board. In these cases, completely automatic operation of the SAFER Route will not be possible. However, in the most basic case, a binder containing maps of the pre-planned routes between key At-Risk Sites and major trauma hospitals and a cellular telephone connection between the Responder Unit vehicle 223 and the traffic management center 213 would allow many of the benefits to accrue, albeit with much more human intervention.

Responder Unit Status

This table contains the currently assigned Route and a summary of same information that is contained in the messages that are sent across the Dispatcher Interface. It is updated during the course of a mission. The fields include:

ResponderUnitID—unique identifier

CommunicationStatus—text flag (e.g., steady signal, intermittent, out of contact, etc.)

CurrentRoute—pointer to the Route feature class the Unit is following

CurrentLocation—coordinates field, current location of unit

DispatchLocation—coordinates field, location to which the unit is being dispatched EvacuationRoute—pointer to the Route feature class the Unit will follow after reaching its DispatchLocation (if known)

EvacuationLocation—coordinates field, location to which the unit will evacuate victims (if known)

6.6.2 Responder Unit Interface

In the ideal implementation, in addition to a reliable voice radio, each Responder Unit vehicle 223 should have the following capabilities:

full-fledged, wireless, high-speed TCP/IP connection from the SAFER Route server to the vehicle, an ESRI-capable on-board computer (e.g., Panasonic's "Toughbook" MDT (Mobile Data Terminal) laptop) to perform the SAFER Route client role, and a GPS unit (e.g., Trimble's GPS/AVL (Automatic Vehicle Locator) system). The interface to the GPS unit can be either direct to the network or through the on-board computer.

While the complete set of this equipment is highly desirable, it is possible to implement a version of SAFER Route system 100 with less than the full complement of equipment. In fact, it is possible to implement the SAFER Route solution with only a reliable voice communication channel.

6.6.2.1 Activation Phase Operation

The TCP/IP connection is used during the Activation Phase to download the Route(s) that will be followed. In the standard implementation, a copy of SAFER Route client software runs on each on-board computer. This software includes the ArcMap-based SAFER Route Unit Tracker Application (see Execution Phase below) with the complete SAFER Grid database 107 available.

In an alternate implementation, all of the ArcView/SAFER Route software runs on the SAFER Route system server. The route information is delivered to the Responder Unit vehicle 223 via a web browser with ESRI's ArcIMS web server providing access to the SAFER Route route information.

6.6.2.2 Execution Phase Operation

During the SAFER Route Execution Phase, the Responder Unit interface 227 is used to transmit to the SAFER Route system 100 the real time position of the Responder Unit vehicle 223 as it follows the active route and to receive route updates from the SAFER Route system 100 in case such updates are required (which is discussed in greater detail herein below in the section entitled "Execution Phase Description"). The information that passes over the responder unit interface 227 from the Responder Unit vehicle 223 to the SAFER route system 100 must include at least the following:

ResponderUnitID—unique identifier
UnitCurrentLocation—coordinates field, current location of unit
UnitCurrentSpeed—numeric field
UnitCurrentDirection—numeric field, compass heading In the standard implementation, each Responder Unit 223 is equipped with a computer on which an on-board client application executes to communicate with the SAFER Route system 100 and to provide the operators of the Responder Unit 223 with real-time information, e.g., updates of the route. A GPS unit is used to provide real-time positioning information to both the on-board client application and the SAFER Route system 100 and traffic management 213 infrastructure. In a web-based implementation, the Responder Unit vehicle 223 only needs to transmit its GPS coordinates to the SAFER Route system 100 on a periodic basis. This implementation might be preferred in situations in which the on-board computer many not have enough processing power to support both the SAFER Route client application and other police/fire/EMS applications that are required to be on the machine.

Finally, in situations where no on-board positioning or computation equipment is available (or is non-operational), a SAFER Route operator can guide the Responder Unit vehicle 223 and control the controllable traffic signals 303 along the route as long as a reliable two-way voice link can be maintained. In this case, the SAFER route operator establishes the route in a local (i.e., in the SAFER Route control center) version of the SAFER Route client, updates the position of the vehicle via manual entries into the client based on voice reports over the radio link, and the SAFER Route system 100 controls the signal infrastructure as in the normal case.

6.6.3 Route Loader

The operation of the Route Loader 225 depends on which of the two implementations discussed in the previous section is used. If a full ArcView system is running on a computer aboard the Responder Unit 223, then the Route Loader 225 transmits the polyline shapefile that corresponds to the selected route for the trip. If the centralized implementation is used, then the Route Loader 225 transmits the web address (URL) of the map web page that is used to manage the trip.

6.7 Traffic Management Interfaces

The interface to the Traffic Management Center Interface 211 is a bi-directional interface and several different types of information flow across it.

6.7.1 Current Conditions Interface

The Current Conditions interface allows systems and/or personnel at the Traffic Management Center (TMC) to make entries and updates to the Current Conditions database 215 described above. The Current Conditions interface is not illustrated explicitly; it may be part of either or both of the Traffic Management interface 211 or the SAFER Route control module 201. Depending on which organization manages the SAFER Routes system 100, the Currents Conditions interface may support direct manipulation of the Current Conditions database 215, or it may merely route information to SAFER Route operators who do the updates using the SAFER Route control module 201. Thus, the Current Conditions interface can be as sophisticated as a direct computer-to-computer connection, or as simple as telephone call or an e-mail text message to a SAFER Route operator.

6.7.2 Route Activation Interface

The Route Activation interface is used to inform the Traffic Management Center (TMC) that a selected SAFER Route route is being put into use. Depending on the level of integration between the TMC and SAFER Route system 100 and protocol used between the two systems, the specific details of the information that passes will differ (this is explained in detail below in the section on the Traffic Control Interface). However, the kind of information that passes over the Route Activation interface includes the following:

ResponderUnitID—unique identifier
UnitType—text field (constrained), ambulance, fire engine, police cruiser, etc.
OrganizationName—text field
OrganizationUnitID—text field, identifies unit using the organization's terminology
Route Definition—a sequence of block names (arcs), and intersections (junctions) that comprise the route with identifiers of the signals ("smart lights") that have been designated for SAFER Route control This information is generated from the designated map layer and the Responder Unit database 209.

6.8 SAFER Route Control

In a preferred embodiment, the SAFER Route Control module 201 function is implemented in the ESRI ArcMap software environment. In addition to using the ArcMap Data View (map display) and Table of Contents (set of active map layers) windows and associated toolbars, the SAFER Route Control module 201 also uses the Visual Basic Editor Immediate Window to display the characteristics of a particular route (e.g., identification of the "smart lights" used in a particular route) in the route activation phase. In the Execution Phase described in the next section, a DataView window is used to display the progress of a Responder Unit 223 along a selected route graphically, and the Visual Basic Editor Immediate Window is used to display and capture the SAFER Route Mission Log (route segments traveled, signals requested, signals released, etc.).

6.9 SAFER Route Log Database

There are two main components in the SAFER Route Log database 203 for each SAFER Route mission that is run. The first of these is the Mission Event Log described in the preceding section. It is stored as an ASCII text file and is captured from the VB Editor Immediate Window. The SAFER Route Log database 203 also includes the information that is recorded by the ESRI GPS Tool (see below). The Mission GPS Logs are stored by the GPS Tool as ESRI Point shapefiles.

7.0 SAFER Route Execution Phase Embodiment

Figure 10:
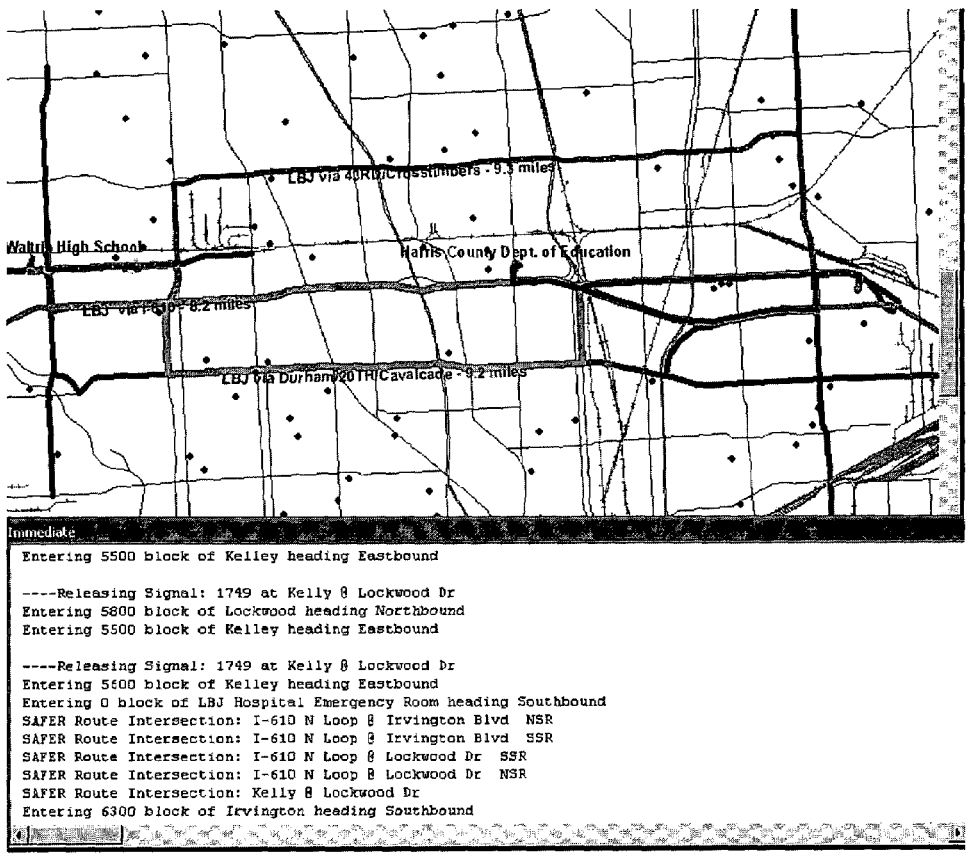
FIG. 10 is a screen shot of an example of a real time route tracking display.

The SAFER Route Execution Phase leverages most of the components of the Activation Phase to accomplish its goals. The implementation of the additional components that are required are described in this section. FIG. 10 is a screen shot of an example of the real time Route Tracking Display 1000.

7.1 Unit Tracker

The Unit Tracker module 305 is the central component of the SAFER Route system 100. After the completion of the Activation Phase, the designated route layer has been selected as the current ArcMap map layer, the GPS device on the Responder Unit 223 is transmitting and the Unit Tracker module 305 has been invoked. In the following discussion, we describe the standard implementation in which the ArcMap system and SAFER Route client software are running on the on-board computer system and is directly connected to the on-board GPS unit. In the alternate implementation, the Unit Tracker module 305 runs on the SAFER Route server, and the Responder Unit 223 only sends GPS position information. The control of the Unit Tracker module 305 is performed by the SAFER Route operator using the SAFER Route Control module 201.

In a preferred embodiment, the Unit Tracker module 305 is implemented as a pair of Visual Basic for Applications (VBA) commands ("Start Tracking", "Stop Tracking") that are interfaced to ESRI's GPS Tool. The ESRI GPS Tool manages all of the communications with the GPS device. It is initialized to sample the GPS device at a prescribed interval (e.g., once per second) write the positional information to a log (part of the SAFER Route Log), and make the position information available to applications through a standard set of VBA function calls.

Because these functions are in VBA, they run in context of and under the control of the ArcMap environment. What this means is that they have complete access to all of the display capabilities of the map window; and any operator action to change the display (e.g., zoom in on a particular area, display additional layers, etc.) can be done with complete freedom.

The following pseudocode describes the implementation of the Start Tracking command of the Unit Tracker module 305:

The Stop Tracking command merely instructs the Start Tracking command to terminate:

TABLE 3

```
function StopTracking( ) {
    Tracking = false
}
```

In the preceding code example of Table 2, the parameter LeadDistance specifies how far ahead of the Responder Unit vehicle 223 the algorithm should look to find the next traffic light to be requested. This enables the SAFER Route system 100 to request control of traffic lights that are outside of the direct line of sight of the Responder Vehicle 223, e.g., around corners, through tunnels. This type of control is a significant advantage over prior art systems which require a clear line of sight to a signal in order to request control (e.g., 3M's Opticom Priority Control System).

The parameter LagDistance specifies how far the Responder Unit vehicle 223 must travel past the signal before the signal is released to standard control. A value of zero releases the light as soon as the system determines the vehicle has passed through the intersection. A value greater than zero keeps the light green under SAFER Route control for a longer distance, thus allowing other, non-SAFER Route equipped vehicles to travel in convoy with the vehicle under SAFER Route control and thus receive the same benefits.

Note that the algorithm uses the actual distance to be traveled along the projected route (commonly referred to as Manhattan distance) rather than the straight line distance between the current position and the end point of each route segment considered (crow flight distance). This provides a much more accurate and realistic treatment of the vehicle's actual travel.

TABLE 2

```
function StartTracking ( ) {
    Tracking = true;
    retrieve Route definition from Layer object
    determine set of "smart signals" along the route
    determine LeadDistance for requesting signal
    determine LagDistance for releasing signal
    connect to GPS device driver
    while( Tracking ) {
        get GPS position
        update display
        determine the RouteSeg that the point is nearest to
        if( this is a new RouteSeg ) {
/* Vehicle has moved onto a new block */
            inform traffic control vehicle is on new block
            if (vehicle has just cleared a signal ) {
/* Current position - LagDistance. This allows for a convoy of vehicles to be       */
/* following behind this vehicle. As long as they remain within LagDistance         */
/* of the leader, they will benefit from the SAFER Route signal control             */
                inform traffic control interface to release traffic signal
            }
        }
        if( vehicle is within LeadDistance of a signal
/* Take into account all signals on this and succeeding RouteSegs */
/* that are within LeadDistance of vehicle using Manhattan Distance, not            */
/* Crow Flight Distance                                                             */
            and it is a smart signal
            and vehicle does not control the signal ) {
                request signal from traffic control interface
        } else if( intersection is a RR crossing ) {
            notify vehicle of upcoming RR crossing
        }
    }
}
```

7.2 Traffic Control Interface

The implementation of the Traffic Control Interface 301 depends on the level of automation and integration that exists in the traffic signal infrastructure where a SAFER Route system 100 is deployed. In a preferred embodiment, wherein a region has a mature implementation of the Intelligent Transportation Systems (ITS) signals, controllers, and centralized computer-based management systems, traffic signals 303 are controlled using "request signal" and "release signal" messages using the standard ITS protocols for remote signal control and management. In areas with a less comprehensive implementation of the ITS technology, or in areas where the local procedures require a "human in the loop", the request/release message can be directed to traffic management personnel 213 who can control the relevant signals manually via their traffic management system consoles. In either situation, the result is that the vehicle under SAFER Route control is given a sequence of green lights along its path of travel, thus enabling it to reach its destination more safely and efficiently.

7.3 Route Update

The Route Update function 307 is primarily a human-mediated activity. A SAFER Route operator monitors the Current Conditions database 215 and the progress of the Responder Unit 223 along a particular route. If the operator determines that the current route is not working as anticipated due to unforeseen circumstances (e.g., traffic accident), an alternate route can be generated using the functionality described above in conjunction with the Route Planning module 119 and the Ad Hoc Routes database 217. Similarly, the Route Update function 307 can be initiated by a request from the Responder Unit 223 if the Responder Unit 223 anticipates difficulty in following the currently assigned route to their destination.

8.0 SAFER Route Administrative Phase Embodiment

The SAFER Route Administrative Phase provides a set of functions for managing the underlying ESRI entities (shapefiles, feature classes and the SAFER Route geodatabase) and supporting database tables.

8.1 Database Access and Reporting

In a preferred embodiment, all interactive database access (to both ESRI objects and non-geometric data) is accomplished through the ESRI ArcMap and Arc Catalog editors. Reports are generated either directly from these editors or via exporting selected data into standard Xbase format datafiles (*.dbf files) that can then be displayed and/or printed in a variety ways using commonly available software for Windows and other systems (e.g., dBase, Clipper, FoxPro).

8.2 Event Posting

The Event Posting function supports the posting and removal of information in the Current Conditions database 215. As described herein above in the description of the Traffic management Interface, the Event Posting task may be performed by either personnel at the Traffic Management Center 213 or by SAFER Route operators using the SAFER Route Control module 201 using information communicated to them over the Traffic Management interface 211. In addition to information provided by the local Traffic Management Center(s) 213, which may include location of accidents, traffic congestion, time impact on traffic, etc.), the Event Posting function may also be used to provide information about scheduled activities in the region which can also affect traffic (e.g., scheduled road/lane closures, schedules and venues for major events, prime shopping days at regional malls, parades). In either situation, the ArcMap Editor functions are used to both to create/modify/delete the polygons that mark the locations of incidents that affect the traffic flows in the CurrentIncidents feature class and the information in the CurrentTimes database table of the Current Conditions database 215. In an alternative embodiment an integrated editing tool combines both operations in a single map-based function.

8.3 Route Promotion

The Route Promotion function provides a SAFER Route operator to take an Ad Hoc Route that was created during the course of a SAFER Route mission and "promote" it to a full-fledged route that can be considered for future missions (Pre-Planned Route) by copying the route from the Ad Hoc Routes database 217 to the Pre-Planned Routes database 121. In the preferred embodiment that task is performed by using ArcCatalog to create and name a new ESRI Route feature class in the SAFER Grid geodatabase 107, and then using the ArcMap Editor to load the shapefile that was created for the Ad Hoc Route, select all of the route segment objects that comprise the route (in their proper order), and then copy those objects into a new ESRI feature class that is created to hold the route in the Pre-Planned Routes database 121. A corresponding entry is also made in the PrePlannedRoutesIndex feature class to record the entry. In the process of doing this, the operator may use editor tools of the SAFER Route Control module to fine-tune the newly created Route.

8.4 Log Analysis

Figure 11:
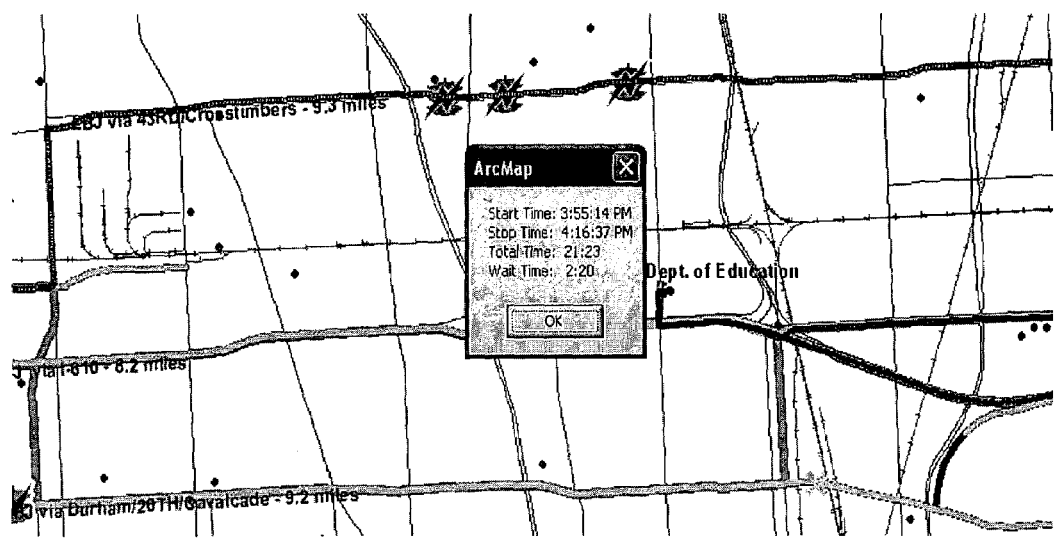
FIG. 11 is a screen shot showing an example of a log analysis display.

As described above, there are two kinds of information that are recorded in the SAFER Route Log database 203, the Mission Event Logs which record the sequence of blocks traveled, intersections transited, and signals controlled and released during a mission, and the GPS point shapefiles that record the GPS readings made during a mission. The Mission Event Logs can be printed and manipulated with standard text processing tools such as Perl. The Mission GPS Log can be examined with the ArcMap Editor and several SAFER Route Analysis Tools have been implemented in VBA to perform such functions as replay the route on the ArcMap display, compute route statistics, and indicate locations where excessive wait time took place. FIG. 11 is a screen shot showing an example of a Log Analysis Display.

9.0 An Example

Figure 12A:
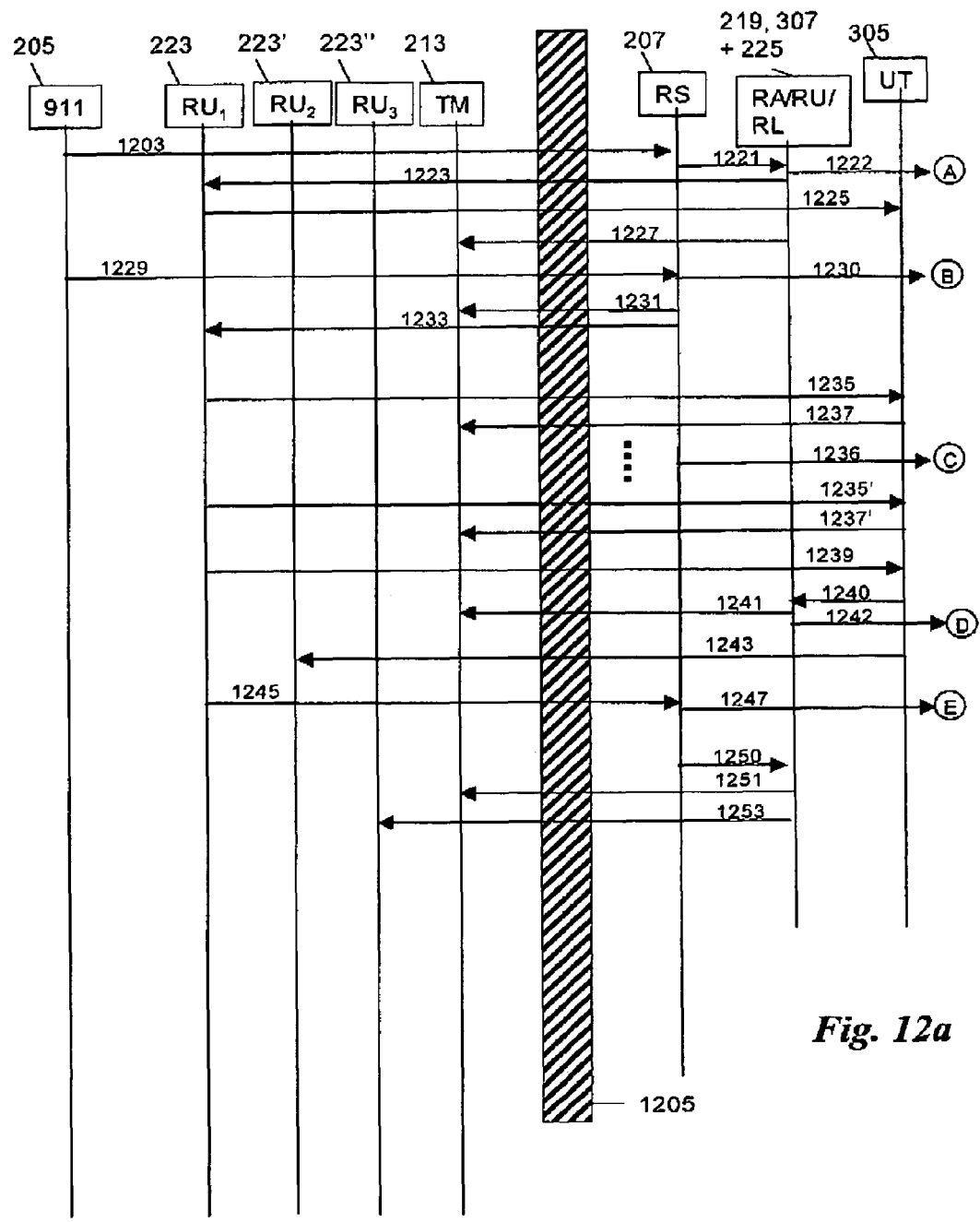
FIGS. 12a and 12b are the left and right portions, respectively, of a sequence diagram illustrating data and message flow during an example response and evacuation controller by a knowledge-based emergency response system according to the invention.
Figure 12B:
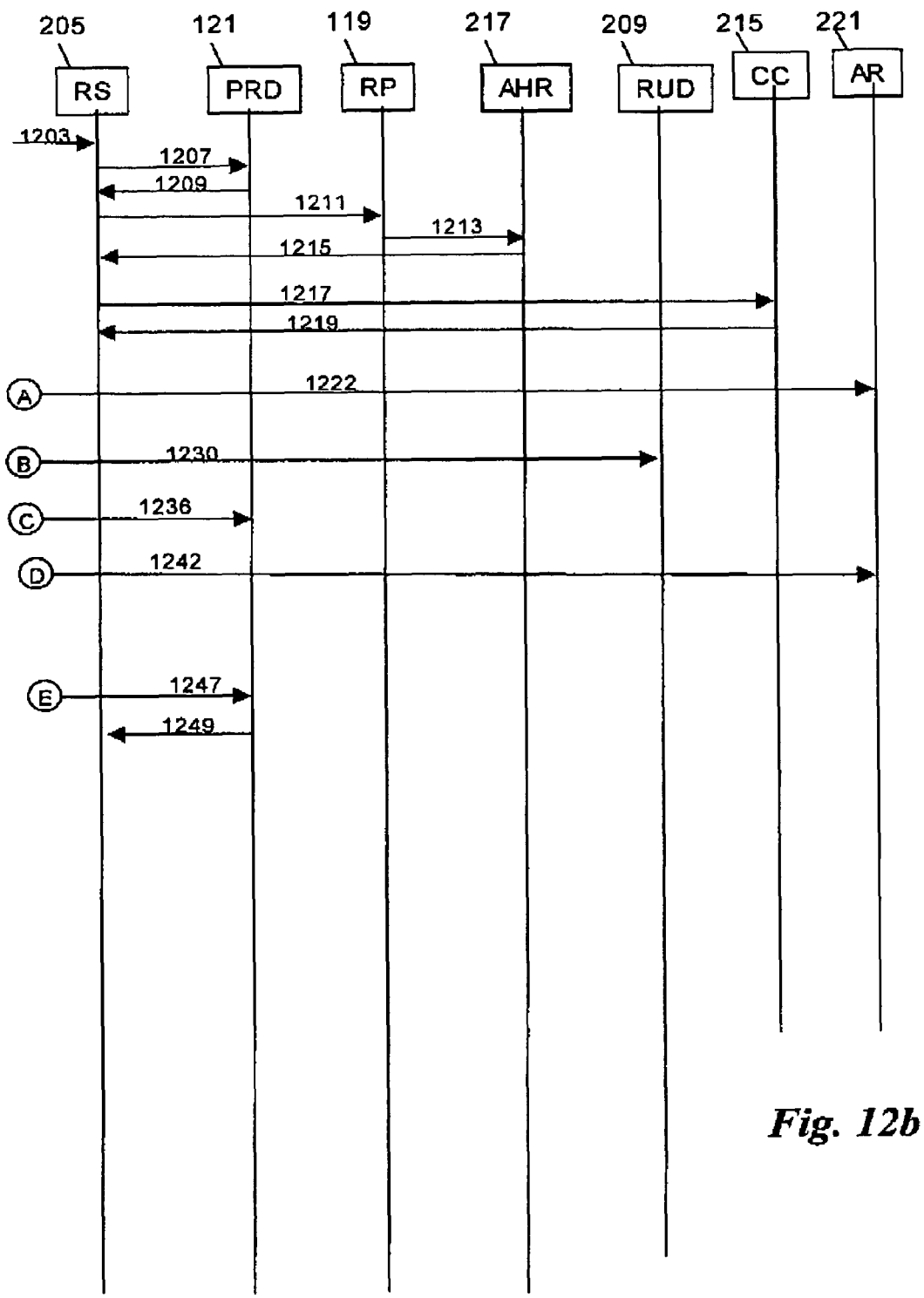

The following example is a hypothetical scenario to illustrate the powerful advancement in the art that is provided by the present invention in which emergency vehicles are provided safe and quick routes to and from an emergency incident by taking advantage of knowledge gathered and stored in the SAFER Route System 100 databases. The example involves a railway accident in Houston at a switching yard located west of interstate 45. FIGS. 12*a* and 12*b* are the left and right portions, respectively, of a timing and message-flow diagram illustrating the interaction between various entities and the SAFER Route System 100. The SAFER Route System 100 is highly dynamic and flexible in how it may be used. Therefore, FIGS. 12*a* and 12*b* and the scenario described herein below should only be taken as examples and not be construed to limit the invention in any way.

At 7:30 AM a train carrying hazardous chemicals derails and several tank cars rupture and catch fire. An employee calls a 911 dispatcher 205. Either the dispatcher 205 or county emergency management monitoring the 911 message traffic realize that this accident is a potentially significant event, 1201, and sends a message to the SAFER system 100 to obtain the best access route from the nearest fire station to the approximale location of the accident, message 1203. The route request message 1203 may be a call to the SAFER Route coordinator who operates the SAFER Route Control module 201, or it may be a computer-to-computer message directly to the SAFER system 100. As described herein above, messages to and from the SAFER system are handled in the preferred embodiment via several special purpose interfaces, e.g., the Dispatcher interface 205, the Traffic Management interface 211, the Responder Unit interface 227, and the Traffic Control interface 301. These interfaces are illustrated in FIG. 12a as the hashed column 1205.

When receiving the route request message 1203, the SAFER system 100 invokes the Route Selection module 207. The interaction between the Route Selection module 207 and other SAFER Route system 100 components is illustrated in FIG. 12b. First the Route Selection module 207 may try to retrieve some alternative pre-planned possible routes from the Pre-Planned Routes database 121, message 1207, which are returned to the Route Selection module, message 1209. Alternatively, the Route Selection module 207 calls on the Route Planning module 119, message 1211, to design one or more ad hoc routes between the fire station and the switching yard. The ad hoc routes would be stored in the Ad Hoc Routes database 217, message 1213, and returned to the Route Selection module 1215.

The Route Selection module 207 then queries the Current Conditions database 215 which has records of planned road work, information on incidents reported in the area, potential morning rush-hour traffic congestion, etc., message pair 1217, 1219. With the aid of the current conditions supplied it, message 1291, the Route Selector 207 selects a generated route that specifies appropriate entrance and exit ramps on I-45 and a route that avoids crossing the railroad tracks involved in the incident.

Having selected a route, the Route Selector module 207 calls on the Route Activation module 219 and the Route Loader module 225 to activate and load the Route, message 1221. The Route Activation module 219 stores the Route in the Active Routes database 221 and informs the designated Responder Unit 223 about which route to take, message 1223, and receives an acknowledgement back from Responder Unit 223, message 1225, specifically to the Unit Tracker 305. In the embodiment in which the Responder Unit 223 has a Mobile Display Terminal (MDT), the message is transmitted to it. Otherwise, the message 1223 to the Responder Unit may simply be a voice call with appropriate directions.

The SAFER system 100 also translates the route to an activation pattern for traffic control boxes along the selected route. This activation pattern, which is designed to provide Responder Units 223 with a wave of green lights along the route, is transmitted to the Responder Units 223 and the Traffic Management authority 213. The activation pattern, which may also include giving the Responder Unit free access to a designated lane on that portion of I-45 that the Responder Unit will travel on its SAFER Route mission, overrides the designated traffic lights thereby providing the wave of green lights using an established protocol (e.g., ITS control messages). Depending on the on-board equipment of the Responder Unit 223, the traffic lights are either requested by the Responder Unit 223 itself, or by Traffic Management 213 personnel following the activation pattern. In the latter case, the Traffic Management authority 213 controls the lights using the usual control systems.

Some time later, 7:36 AM, there is another 911 call that pin-points the location of the incident. This is transmitted, message 1229, to the SAFER Route system 100. This more precise location is entered into a responder unit status table in the Responder Unit database 209, message 1230 and the selected route is revised if necessary. The revised route is transmitted to the traffic control 213/301 and the Responder Unit 223 that is en route to the incident, messages 1231 and 1233, respectively.

During the execution of a SAFER Route mission, the Responder Unit 223 periodically informs the Unit Tracker 305 of its location, for example as exemplified by messages 1235 and 1235'. In response, the Unit Tracker 305 may inform the Traffic Management 213 or the Traffic Control Interface 301 so as to update which traffic lights to control and release, e.g., messages 1237 and 1237'.

In parallel with the above activities, a preferred route from the incident to the nearest medical emergency center is pre-computed by default. These routes are stored in the Pre-Planned Routes database 121, message 1236.

At 7:44 AM the Fire Department assets, e.g., Responder Unit 223, arrive on the scene, message 1239. The Unit Tracker module 305 informs Traffic Management 213, message 1241, that the destination has been reached and that the route is no longer in use. The route is also removed from the Active Routes database 221, message 1242.

At 7:47 AM the Police Department is informed and several patrol cars are dispatched to the scene. Via their on-board MDTs 505, these Response Units 223' are informed of the precise location of the incident and provided their own SAFER Route routes to the scene, message 1243. The details of establishing this route is similar as shown above in messages 1203 et seq. and is therefore not repeated here.

At 7:55 AM the heat from the fire triggers an explosion in a nearby railroad car. A fireman is injured and must be evacuated to a nearby hospital. The fire chief in charge triggers a new SAFER Route evacuation, message 1245. The request received by the Route Selection module 205, which in turn asks to retrieve the evacuation route from the incident site to the hospital that was pre-computed and stored by message 1236, messages 1247 and 1249. The retrieved Route is activated, message 1250, and communicated to traffic management, message 1251 and to the ambulance that will perform the evacuation, Responder Unit 223", message 1253.

Having access to a SAFER Route route, the ambulance is able to rush to the hospital on a protected route with only green lights and the injured fireman is able to obtain medical attention only minutes after having been injured.

10.0 Glossary

ArcIMS An ESRI software system that allows scalable Internet mapping and distributed GIS solutions ArcView An ESRI GIS software system for visualizing, managing, creating, and analyzing geographic data. It includes the modules ArcView (map display and editing) and ArcCatalog (geodatabase management)

EMS Emergency Medical Services

ESRI Environmental Systems Research Institute, a vendor of GIS software and systems Feature A representation of a real-world object on a map Feature Class A collection of geographic features with the same geometry type (such as point, line, or polygon), the same attributes, and the same spatial reference Geodatabase An object-oriented data model introduced by ESRI that represents geographic features and attributes as objects and the relationships between objects but is hosted inside a relational database management system. A geodatabase can store objects, such as feature classes, feature datasets, nonspatial tables, and relationship classes GIS Geographical Information System. A system designed to capture, store, update, manipulate, analyze, and display the geographic information. A GIS is typically used to represent maps as data layers that can be studied and used to perform analyses.

GPS Global Positioning System. A constellation of 24 radio-emitting satellites deployed by the U.S. Department of Defense and used to determine location on the earth's surface ITS Intelligent Transportation Systems Layer The visual representation of a geographic dataset in any digital map environment; an description that defines how the data should be symbolized on a map MDT Mobile Display Terminal OEM Office of Emergency Management Polyline a digital representation of a place or thing that has length but not area at a particular scale, such as a river on a world map or a street on a city map TMC Traffic Management Center SAFER Trademark of SAFER Technologies, L.L.C., derived from "Systems Architecture for Emergency Response"

11.0 Conclusion

From the foregoing it will be appreciated that the knowledge based system and method for emergency response of the present invention represents a significant advance in the manner in which emergency response vehicles travel to emergency locations where their assistance is required. The present invention presents a way to collect and use information that is useful to design and select the best possible routes for emergency vehicles to use in such missions. The present invention further presents a way to use these routes during emergency missions and update the routes in a real-time manner. By using the invention, traffic control devices may be used along the selected routes to ensure that emergency vehicles may travel as rapidly and safely as possible to their destination. Thus, both the value of the emergency missions are improved because the responders may provide quicker assistance or deliver victims to critical care sooner. Furthermore, because emergency vehicles can travel on routes that have been made safer, overall traffic safety is improved.

While the present invention has been described herein in the context of emergency response, it should be noted that the invention may be applied in other domains. Any entity with voice communications and positioning capabilities could benefit from use of the invention in an emergency or other critical situation. Commercial applications are also possible. For example, with the proper authorization and possibly a licensing fee, a fleet of trucks might be granted preferential access to certain routes. Another example is to grant a funeral procession a SAFER route from the church or funeral home to the cemetery, thus avoiding the tragic accidents that sometimes occur when conventional traffic control measures are used.

Although specific embodiments of the invention have been described and illustrated, the invention is not to be limited to the specific forms or arrangements of parts so described and illustrated. The invention is limited only by the claims.

We claim:

1. A computer system for establishing and managing routes for emergency vehicles having a server computer with an attached storage medium, comprising:

the attached storage medium having:
 a knowledge base having:
  information useful in establishing and managing routes for emergency vehicles having information on intersections, road segments connecting intersections, expected travel time along the road segments, and dynamic factors that influence traffic flow,
  a routes database for storing routes designed using the information useful in establishing and managing routes, wherein the routes database includes a pre-planned routes database having route data objects that represent pre-planned routes between at-risk sites and responder sites;
 one or more modules operable to cause the computer to retrieve information from the knowledge base and to perform an operation selected from designing one or more routes between a first location and a second location, selecting a route from the routes database, modifying a route in the routes database thereby producing a selected route for a response unit;
a unit tracker operable
 to receive information indicative of location of a response unit;
 to receive information indicative of current conditions along the selected route; and
 to cause information indicative of the current conditions along the selected route to be transmitted to the responder unit.

2. The knowledge-based system of claim 1, wherein the knowledge base further comprises a road grid database having information for each intersection indicative of the type of traffic control device used at the intersection; and the unit tracker is further operable to receive information indicative of location of a response unit, and to use the information indicative of location of a response unit to transmit signals to the traffic control devices on the selected route and proximate to the location of the responder unit whereby controllable traffic control devices proximate to the location of the responder unit are caused to display a green light allowing the responder unit unhindered passage through each intersection controlled by a controllable traffic control device.

3. The knowledge-based system of claim 2, wherein the route update module further comprises:
 logic to transmit the information indicative of current conditions along the selected route to an operator;
 logic to receive instructions from the operator to modify the selected route; and
 logic to modify the selected route according to the instructions received from the operator.

4. The knowledge-based system of claim 1, wherein to modify the selected route includes replacing the selected route with another route.

5. The knowledge-based system of claim 1, wherein the road grid database comprises:
 arc objects corresponding to road segments having an average time (AT) function of time of day, wherein the AT function value for a time of day value is the average travel time of the corresponding road segment at that time of day;
 junction objects corresponding to connections between two arc objects defining an allowed path across an intersection connecting two road segments corresponding to the two arcs and having a junction average time (JT) function of time of day, wherein the JT function value for a time of day value is the average travel time across the allowed path across the intersection;
 wherein the routes database comprises:
 route data objects comprising an ordered list of arcs and junctions such that each route data object corresponds to a possible travel route from a first location to a second location.

6. The knowledge-based system of claim 2 wherein the unit tracker is further operable to control traffic signals along the selected route is further operable to maintain the green lights for other vehicles in a convoy of responding emergency vehicles accompanying a designated responding vehicle.

7. A data processing system for establishing and managing routes for emergency vehicles, comprising:
   an augmented road grid database having information describing a road network including information concerning intersections in the road network including information specifying intersections having traffic control, nature of the traffic control; and
   information specifying segments having special traffic control or traffic flow capabilities;
   a pre-planned route database containing pre-planned routes between at least one at-risk location and one responder site; and
   a route planner comprising:
      logic to access the augmented road grid database;
      logic to compute potential routes between at least one at-risk location and one responder site;
      a user interface operable to enable the selection of designated potential routes for storage in the pre-planned route database; and
      logic to store selected potential routes in the pre-planned route database.

8. The data processing system of claim 7 wherein the route planner comprises logic to propose modification to proposed routes and alternative routes.

9. The data processing system of claim 7 wherein the route planner comprises logic to propose routes based on which routes traverse intersections with controllable traffic signals.

10. The data processing system of claim 9 further comprising logic operable to control traffic signals along a selected route to provide a sequence of green lights for any responding emergency vehicle.

11. The data processing system of claim 10 wherein at least one responding emergency vehicle has some means to communicate location information indicating the location of the emergency vehicle along the selected route and wherein the logic operable to control traffic signals further comprises logic to receive the emergency vehicle location information and to activate and deactivate traffic signals along the selected route in response to the emergency vehicle location information.

12. The data processing system of claim 10 wherein the logic operable to control traffic signals along the selected route is further operable to maintain the green lights for other vehicles in a convoy of responding emergency vehicles accompanying a designated responding vehicle.

13. A method for establishing and managing routes for emergency vehicles using a knowledge base, comprising:
   creating a knowledge base having:
      information useful in establishing and managing routes for emergency vehicles having information on intersections, road segments connecting intersections, expected travel time along the road segments, and dynamic factors that influence traffic flow, and
      a routes database for storing routes designed using the information useful in establishing and managing routes, wherein the routes database includes a pre-planned routes database having route data objects that represent pre-planned routes between at-risk sites and responder sites; and
   retrieving information from the knowledge base;
   performing an operation selected from designing one or more routes between a first location and a second location, selecting a route from the routes database, and modifying a route in the routes database; and
   tracking the location of a response unit by:
      receiving information indicative of location of a response unit;
      receiving information indicative of current conditions along the selected route; and
      causing the information indicative of current conditions along the selected route to be transmitted to the responder unit.

14. The method of claim 13 further comprising:
   updating the route traveled by the response unit in response to the received current conditions; and
   transmitting the updated route to the response unit.

15. The method of claim 13 wherein the knowledge-base further comprises a road grid database having information for each intersection indicative of the type of traffic control device used at the intersection and the method further comprises:
   receiving information indicative of location of a response unit, and
   using the information indicative of location of a response unit to transmit signals to the traffic control devices on the selected route and proximate to the location of the responder unit whereby traffic control devices proximate to the location of the responder unit are caused to display a green light allowing the responder unit unhindered passage through an intersection controlled by the traffic control device.

16. The method of claim 13, wherein the operation is modifying a route, the method further comprising detecting a change in at least one dynamic factor or the addition of a new dynamic factor affecting at least one route in the first database and modifying at least one route in the routes database.

17. The method of claim 16, wherein the step of modifying a route further comprises:
   transmitting the information indicative of current conditions along the selected route to an operator;
   receiving instructions from the operator to modify the selected route; and
   modifying the selected route according to the instructions received from the operator.

18. The method of claim 16, wherein modifying the selected route includes replacing the selected route with another route.

19. The method of claim 15, wherein the road grid database comprises:
   arc objects corresponding to road segments having an average time (AT) function of time of day, wherein the AT function value for a time of day value is the average travel time of the corresponding road segment at that time of day;
   junction objects corresponding to connections between two arc objects defining an allowed path across an intersection connecting two road segments corresponding to the two arcs and having a junction average time (JT) function of time of day, wherein the JT function value for a time of day value is the average travel time across the allowed path across the intersection;
   wherein the routes database comprises:
   route data objects comprising an ordered list of arcs and junctions such that each route data object corresponds to a possible travel route from a first location to a second location.

20. The method of claim 13 further comprising:
   receiving information indicative of location of a response unit, and to use the information indicative of location of a response unit to transmit signals to the traffic control devices on the selected route and proximate to the location of the responder unit whereby controllable traffic control devices proximate to the location of the responder unit are caused to display a green light allowing the responder unit unhindered passage through each intersection controlled by a controllable traffic control device; and controlling the traffic signals along the selected route is further operable to maintain the green lights for other vehicles in a convoy of responding emergency vehicles accompanying a designated responding vehicle.

21. A computer system for establishing and managing routes for emergency vehicles having a server computer with an attached storage medium, comprising:

the attached storage medium having:

a knowledge base having:
information useful in establishing and managing routes for emergency vehicles having information on intersections, road segments connecting intersections, expected travel time along the road segments, and dynamic factors that influence traffic flow, a road grid database having
arc objects corresponding to road segments having an average time (AT) function of time of day, wherein the AT function value for a time of day value is the average travel time of the corresponding road segment at that time of day; and
junction objects corresponding to connections between two arc objects defining an allowed path across an intersection connecting two road segments corresponding to the two arcs and having a junction average time (JT) function of time of day, wherein the JT function value for a time of day value is the average travel time across the allowed path across the intersection;

a routes database for storing routes designed using the information useful in establishing and managing routes comprising route data objects comprising an ordered list of arcs and junctions such that each route data object corresponds to a possible travel route from a first location to a second location;

one or more modules operable to cause the computer to retrieve information from the knowledge base and to perform an operation selected from designing one or more routes between a first location and a second location, selecting a route from the routes database, modifying a route in the routes database;

a unit tracker operable
to receive information indicative of location of a response unit;
to receive information indicative of current conditions along the selected route; and
to cause information indicative of the current conditions along the selected route to be transmitted to the responder unit.

22. A computer system for establishing and managing routes for emergency vehicles having a server computer with an attached storage medium, comprising:

the attached storage medium having:
a knowledge base having:
information useful in establishing and managing routes for emergency vehicles having information on intersections, road segments connecting intersections, expected travel time along the road segments, and dynamic factors that influence traffic flow,
a road grid database having information for each intersection indicative of the type of traffic control device used at the intersection,
a routes database for storing routes designed using the information useful in establishing and managing routes;

one or more modules operable to cause the computer to retrieve information from the knowledge base and to perform an operation selected from designing one or more routes between a first location and a second location, selecting a route from the routes database, modifying a route in the routes database;

a unit tracker operable
to receive information indicative of location of a response unit;
to receive information indicative of current conditions along the selected route;
to cause information indicative of the current conditions along the selected route to be transmitted to the responder unit; and
to receive information indicative of location of a response unit, and to use the information indicative of location of a response unit to transmit signals to the traffic control devices on the selected route and proximate to the location of the responder unit whereby controllable traffic control devices proximate to the location of the responder unit are caused to display a green light allowing the responder unit unhindered passage through each intersection controlled by a controllable traffic control device.

23. The computer system for establishing and managing routes for emergency vehicles of claim 22 wherein the unit tracker is further operable to to control traffic signals along the selected route is further operable to maintain the green lights for other vehicles in a convoy of responding emergency vehicles accompanying a designated responding vehicle.

24. The dataprocessing system of claim 7 further comprising:
logic to modify a selected route in the route database.

25. The dataprocessing system of claim 7 further comprising:
logic to modify the selected route by replacing the selected route with another route.

26. The dataprocessing system of claim 10 further comprising:
logic to transmit the information indicative of current conditions along the selected route to an operator;
logic to receive instructions from the operator to modify the selected route; and
logic to modify the selected route according to the instructions received from the operator.

27. The dataprocessing system of claim 7, wherein the road grid database further comprises:
arc objects corresponding to road segments having an average time (AT) function of time of day, wherein the AT function value for a time of day value is the average travel time of the corresponding road segment at that time of day;
junction objects corresponding to connections between two arc objects defining an allowed path across an intersection connecting two road segments corresponding to the two arcs and having a junction average time (JT) function of time of day, wherein the time across the allowed path across the intersection;
wherein the routes database comprises:
route data objects comprising an ordered list of arcs and junctions such that each route data object corresponds to a possible travel route from a first location to a second location.

28. The dataprocessing system of claim 7, further comprising:
logic to update the selected route in response to the received current conditions; and
transmitting the updated route to the response unit.

29. The dataprocessing system of claim 7, further comprising:
  logic to modify at least one route in the pre-planned route database by detecting a change in at least one dynamic factor or the addition of a new dynamic factor affecting the at least one route in the first database and modifying the at least one route in the routes database.

30. The method of claim 13 wherein the knowledge base further comprises:
  a road grid database having information for each intersection indicative of the type of traffic control device used at the intersection; and
  the method further comprises:
  tracking a location of a response unit, and to use the location of a response unit to transmit signals to the traffic control devices on the selected route and proximate to the location of the responder unit whereby controllable traffic control devices proximate to the location of the responder unit are caused to display a green light allowing the responder unit unhindered passage through each intersection controlled by a controllable traffic control device.

31. The method of claim 13 wherein selecting a route comprises proposing routes based on which routes traverse intersections with controllable traffic signals.

32. The method of claim 13 further comprising:
  proposing modifications to selected routes and proposing alternative routes.

33. The knowledge-based system of claim 1 wherein the selected operation comprises proposing at least one route based on which routes traverse intersections with controllable traffic signals.

34. The knowledge-based system of claim 1 wherein the unit tracker is further operable to update the route traveled by the response unit in response to the received current conditions; and transmitting the updated route to the response unit.

35. The knowledge-based system of claim 1 further comprising a module to propose modification to proposed routes and to propose alternative routes.

36. The knowledge-based system of claim 1 further comprising a module to modify at least one route in the pre-planned route database by detecting a change in at least one dynamic factor or the addition of a new dynamic factor affecting the at least one route in the first database and modifying the at least one route in the routes database.

* * * * *